(12) United States Patent
Aiso

(10) Patent No.: US 7,327,494 B2
(45) Date of Patent: Feb. 5, 2008

(54) IMAGE PRODUCING DEVICE AND IMAGE DEVIATION AMOUNT DETECTION DEVICE

(75) Inventor: Seiji Aiso, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 918 days.

(21) Appl. No.: 10/751,201

(22) Filed: Jan. 2, 2004

(65) Prior Publication Data

US 2004/0197075 A1    Oct. 7, 2004

(30) Foreign Application Priority Data

Jan. 7, 2003   (JP)   ............................. 2003-001124
Sep. 30, 2003  (JP)   ............................. 2003-339880

(51) Int. Cl.
*H04N 1/387* (2006.01)
*H04N 1/409* (2006.01)
*G06K 15/00* (2006.01)

(52) U.S. Cl. ..................... 358/1.9; 358/3.06; 358/3.26; 382/289; 382/275

(58) Field of Classification Search ................. 358/1.9, 358/3.06, 3.26; 382/286, 275; 348/208.4, 348/220.1, 241, 583, 607, 715; 386/8, 120, 386/121
See application file for complete search history.

(56) References Cited

FOREIGN PATENT DOCUMENTS

| JP | 11-164264 | 6/1999 |
|---|---|---|
| JP | 3367954 | 1/2003 |
| JP | 2003-092724 | 3/2003 |

OTHER PUBLICATIONS

Abstract of Japanese Patent Publication No. 11-164264, Pub. Date: Jun. 18, 1999, Patent Abstracts of Japan.
Abstract of Japanese Patent Publication No. 03-138396, Pub. Date: Jun. 12, 1991, Patent Abstracts of Japan.
Abstract of Japanese Patent Publication No. 2003-092724, Pub. Date: Mar. 28, 2003, Patent Abstracts of Japan.

*Primary Examiner*—Scott A. Rogers
(74) *Attorney, Agent, or Firm*—Martine Penilla & Gencarella, LLP

(57) ABSTRACT

A construction is used in which a plurality of sets of frame information are acquired from video information, rotation amount information that expresses the rotational deviation among the images expressed by the abovementioned plurality of sets of frame information is acquired on the basis of the acquired plurality of sets of frame information, conversion processing is performed in which at least one of the abovementioned plurality of sets of frame information is converted by rotating at least one of the respective images expressed by the plurality of sets of frame information on the basis of the acquired rotation amount information so that the rotational deviation among the images is reduced, and image data that expresses images in halftones using numerous pixels is produced by synthesizing a plurality of sets of frame information on which conversion processing has been performed.

By using such a construction, it is possible to obtain still images with a high image quality from a plurality of sets of frame information in video information; furthermore, manual blurring containing diagonal components can be sufficiently corrected.

25 Claims, 20 Drawing Sheets

Fig.5
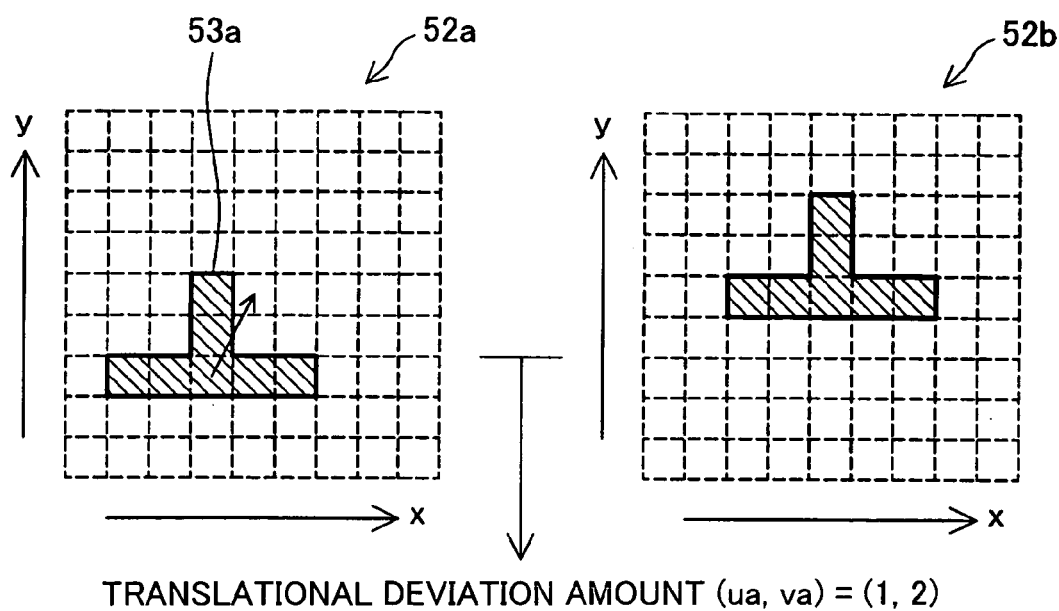
TRANSLATIONAL DEVIATION AMOUNT (ua, va) = (1, 2)
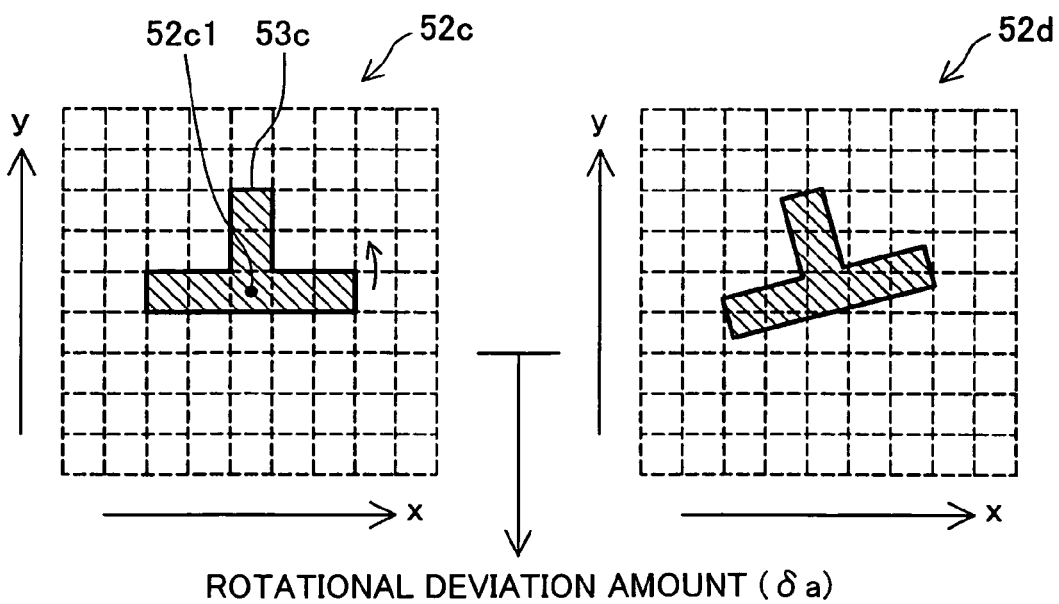
ROTATIONAL DEVIATION AMOUNT ($\delta a$)

Fig.7
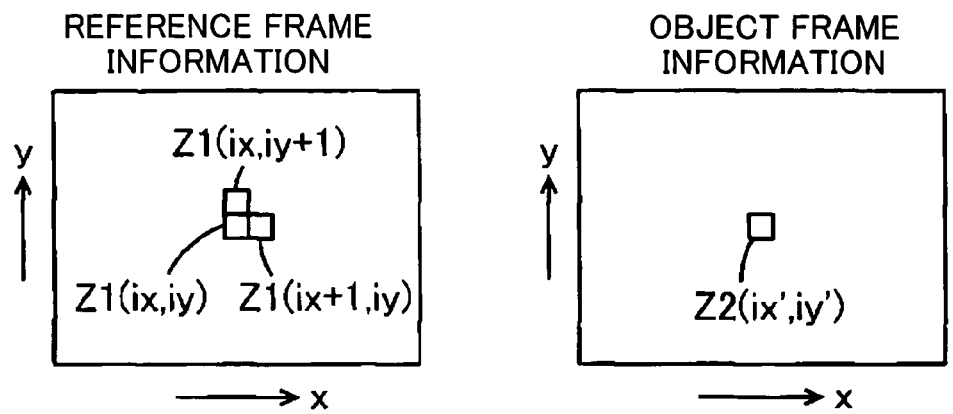
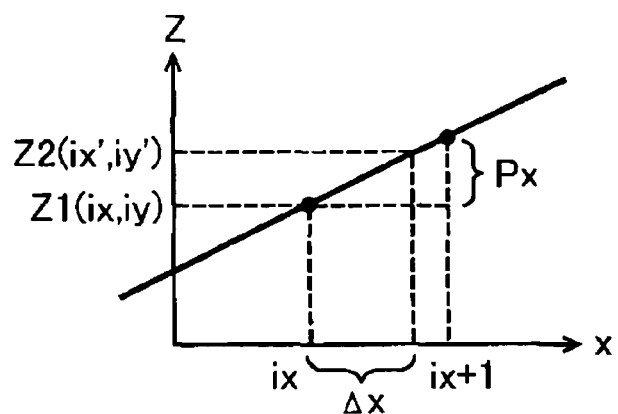
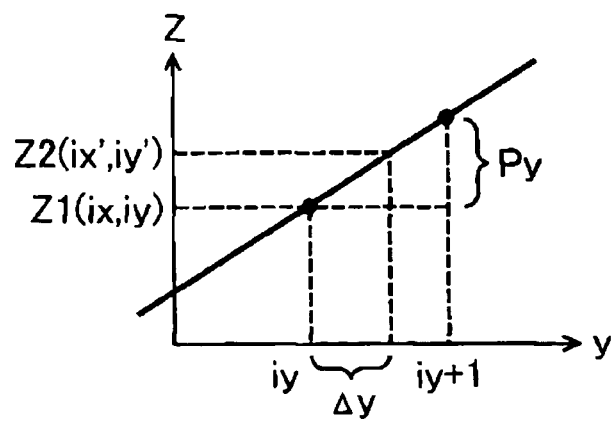

● PIXELS OF PRODUCED IMAGE
◇ PIXELS OF FRAME 1  ◈ PIXELS OF FRAME 2
◈ PIXELS OF FRAME 3  ◈ PIXELS OF FRAME 4

● PIXELS OF PRODUCED IMAGE
◇ PIXELS OF FRAME 1
◈ PIXELS OF FRAME 2
◈ PIXELS OF FRAME 3
◈ PIXELS OF FRAME 4

Fig.20
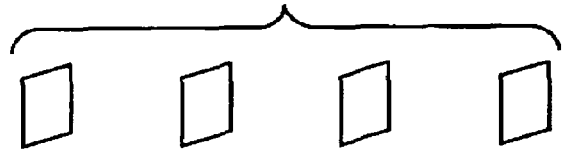
PLURALITY OF SETS OF FRAME INFORMATION
f = 1   f = 2   f = 3   f = 4
u1    u2    u3
v1    v2    v3
$\delta_1$   $\delta_2$   $\delta_3$
⇩
f = 2   f = 3   f = 4
| −u1 | −u1−u2 | −u1−u2−u3 |
| −v1 | −v1−v2 | −v1−v2−v3 |
| −$\delta_1$ | −$\delta_1$−$\delta_2$ | −$\delta_1$−$\delta_2$−$\delta_3$ |
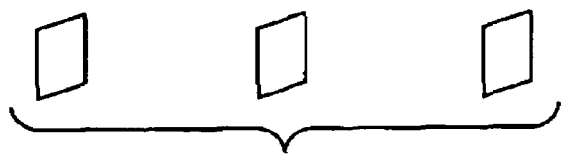
SYNTHESIS
↓
 — IMAGE DATA

IMAGE PRODUCING DEVICE AND IMAGE DEVIATION AMOUNT DETECTION DEVICE

BACKGROUND OF THE INVENTION

1. Field of the Invention

The present invention relates to a technique of producing image data from video information comprising a numerous sets of frame information.

2. Description of the Related Art

Conventionally, image data which expresses still images has been produced from video information expressing video images acquired by digital video or the like, and still images have been printed on the basis of this image data. Video information is constructed from numerous sets of frame information that express images by means of halftone data for numerous individual pixels, and image data which expresses still images in halftones by means of numerous pixels is produced by acquiring and synthesizing a plurality of sets of frame information from the same video information. Since manual blurring may occur in video images acquired by digital video or the like, the deviation in the horizontal direction and vertical direction among images expressed by a plurality of sets of frame data is detected in pixel units, and the deviation in the vertical direction and horizontal direction is reduced by causing images superimposed on a reference image to perform a translational movement (parallel movement) by Nx pixels in the horizontal direction and Ny pixels in the vertical direction (Nx and Ny are positive integers).

Furthermore, the following method is disclosed in Japanese Patent Application Laid-Open No. 11-164264: specifically, in the case of a conversion in degree of resolution from images with a standard resolution to images with a high resolution, a memory for high resolution images is provided, the movement of the images is detected, and the respective pixels of the high resolution images are embedded using the pixels of a plurality of standard resolution images that are moved in parallel in accordance with the movement of the images.

Manual blurring includes not only translational deviation in the horizontal direction and vertical direction, but also diagonal components. Consequently, manual blurring cannot be sufficiently corrected in the case of the abovementioned conventional techniques. Accordingly, there has been a desire to obtain still images with a high image quality from a plurality of sets of frame information in video information by more adequately correcting manual blurring.

SUMMARY OF THE INVENTION

The present invention was devised in light of the abovementioned problems; it is an object of the present invention to provide a technique that make it possible to obtain high-quality still images from a plurality of sets of frame information in video information.

In the present invention, in order to achieve the abovementioned object, a plurality of sets of frame information are acquired from video information by a frame acquisition module. Then, on the basis of the plurality of sets of frame information acquired by the frame acquisition module, a deviation amount acquisition module acquires rotation amount information that expresses the rotational deviation among images expressed by the same plurality of sets of frame information. Then, on the basis of rotation amount information acquired by the deviation amount acquisition module, a conversion module performs conversion processing that converts at least one set of the same plurality of sets of frame information so that at least one of the respective images expressed by the plurality of sets of frame information is rotated in a manner that reduces the rotational deviation among the images. Then, a synthesizing module synthesizes the plurality of sets of frame information on which conversion processing has been performed by the conversion module, so that image data that expresses images in halftones by means of numerous pixels is produced.

Specifically, since the image data that expresses images in halftones is produced by synthesis from a plurality of sets of frame information in which the rotational deviation among the plurality of images expressed by the same plurality of sets of frame information has been reduced, manual blurring including rotational components is corrected. Accordingly, high-quality still images can be obtained from a plurality of sets of frame information in video information.

For example, the abovementioned frame information or image data may conceivably comprise information in various types of data formats such as bit map data, compressed data or the like. Furthermore, the same frame information or image data may conceivably comprise various types of data such as YCbCr data constructed from brilliance data (Y) and chrominance difference data (Cb, Cr), RGB data constructed from red data (R), green data (G) and blue data (B), CMYaG data constructed from cyan data (C), magenta data (M), yellow data (Ye) and green data (G), Lab data in the Lab space constituting the CIE standard or the like.

The abovementioned numerous sets of frame information may constitute information that is continuous in a time series, and the abovementioned frame acquisition module may acquire a plurality of sets of frame information that are continuous in a time series from these numerous sets of frame information. Since image data that expresses still images is produced by the synthesis of frame information that is continuous in a time series with little variation, high-quality still images can be obtained using a simple construction.

A construction may also be used in which the abovementioned deviation amount acquisition module acquires translational movement amount information expressing the translational deviation expressed by the abovementioned plurality of sets of frame information from these plurality of sets of frame information, and the abovementioned conversion module performs conversion processing on the basis of the abovementioned acquired translational movement amount information which converts at least one of the abovementioned plurality of sets of frame information so that at least one of the respective images expressed by the abovementioned plurality of sets of frame information is caused to undergo translational movement that reduces the translational deviation among the images.

Specifically, still images are produce by synthesizing frame information so that the translational deviation (vertical and horizontal deviation) among sets of frame information is reduced. Furthermore, the diagonal components of manual blurring are more reliably corrected by reducing the translational deviation of the specified central positions about which the images are rotated. Accordingly, even higher-quality still images can be obtained.

If the abovementioned conversion module performs conversion processing in which at least one of the abovementioned plurality of sets of frame information is converted so that the rotational deviation or translational deviation among the images is reduced by causing at least one of the respective images expressed by the abovementioned plurality of sets of frame information to rotate or perform a translational movement, an even more desirable construction is obtained.

The abovementioned rotation amount information and translational movement amount information, as well as various types of information such as (for example) numerical value information, character information and the like, are conceivable.

As a concrete example of the abovementioned conversion processing, the conversion module may perform conversion processing in which the positions of the respective pixels of at least one of the abovementioned plurality of sets of frame information are converted on the basis of the abovementioned rotation amount information and translational movement amount information so that both of the abovementioned types of image deviation are reduced. In this case, the conversion module may convert the positions of the respective pixels of at least one of the plurality of sets of frame information in units that are finer than these pixels. Since the position conversion (coordinate conversion) of the respective pixels of the frame information can be performed with high precision, even higher-quality still images can be obtained.

The abovementioned deviation amount acquisition module may have a construction in which the abovementioned rotation amount information and translational movement amount information are acquired by determining the rotational deviation and translational deviation among the abovementioned images on the basis of the positions of the abovementioned pixels and halftone data for these pixels in the abovementioned plurality of sets of frame information using a calculation system that determines this rotational deviation and translational deviation by the method of least squares. By using such a calculation system, it is possible to determine the rotational deviation and translational deviation at a high speed; accordingly, the speed of the processing that produces the image data can be increased.

The abovementioned synthesizing module may have a construction in which the abovementioned image data is produced using numbers of pixels that are different from those of the abovementioned frame information. Since the numbers of pixels of the images expressed by the image data can be varied, the resolution of the still images (for example) can be varied, so that still images that are more in accordance with the images desired can be obtained.

In this case, the abovementioned synthesizing module may also have a construction in which the abovementioned image data is produced using a number of pixels that is greater than that of the abovementioned frame information. Since the number of pixels of the images expressed by the image data is increased, (for example) still images with a high image quality can be produced with a higher resolution, so that still images that are more in accordance with the images desired can be obtained.

Of course, even if the number of pixels of the images expressed by the image data is the same as the number of pixels of the images expressed by the frame information, this merely module that the number of pixels of the still images cannot be varied; high-quality still images can still be obtained.

In cases where image data is produced from three or more sets of frame information, the following construction may be used: specifically, the first set of rotation amount information that is acquired by the deviation amount acquisition module is information that expresses the rotational deviation of both images expressed by the first and second sets of frame information that are continuous in time series order. The second set of rotation amount information that is acquired by the deviation amount acquisition module is information that expresses the rotational deviation of both images expressed by the second and third sets of frame information that are continuous in time series order. The second set of frame information is converted by the conversion module so that the rotational deviation with respect to the image expressed by the first set of frame information is reduced. The third set of frame information is converted by the same conversion module so that the rotational deviation with respect to the image expressed by the first set of frame information is reduced. Here, since the rotational deviation among the images expressed by the second and third sets of frame information is generally less than the rotational deviation among the images expressed by the first and third sets of frame information, rotation amount information that expresses the rotational deviation with a higher degree of precision can be acquired. Accordingly, images with a higher image quality can be obtained.

The abovementioned synthesizing module may also have a construction in which the abovementioned image data is produced by performing specified interpolation processing from a plurality of sets of frame information on which the abovementioned conversion processing has been performed. Since image data for the respective pixels is produced by interpolation, still images with a higher image quality can be obtained.

The abovementioned synthesizing module may also have a construction in which the abovementioned interpolation processing is performed using halftone data for pixels that are present in the areas surrounding a pixel of interest that produces the abovementioned image data (among the total pixels of the abovementioned plurality of sets of frame information) while this pixel of interest is successively moved, and the abovementioned image data is produced from the halftone data following interpolation processing. Since image data for the respective pixels is produced using halftone data for pixels present in the surrounding area, still images that have a higher image quality can be obtained.

Here, even if the frame information is not converted so that rotational deviation or the like is reduced, an effect that causes the still images to have a higher image quality is obtained as a result of the abovementioned construction. Accordingly, the following construction may also be used. Specifically, the synthesizing module performs a specified interpolation using halftone data for pixels present in the area surrounding a pixel of interest that produces image data (among all of the pixels of a plurality of sets of frame information) while successively moving this pixel of interest, and image data is produced from the halftone data following this interpolation processing. Since image data for the respective pixels is produced using halftone data for pixels present in the surrounding area, still images that have a higher image quality can be obtained.

The abovementioned synthesizing module may also have a construction in which the abovementioned interpolation processing is performed using halftone data for the pixel that is closest to the abovementioned pixel of interest (among all the pixels of the abovementioned plurality of sets of frame information). When a test was conducted, no jaggy (zig-zag pattern) was seen in the edge portions of the image. Accordingly, still images with a higher image quality can be obtained using this construction.

In this case, the abovementioned synthesizing module may also have a construction in which the abovementioned interpolation processing is performed using frame information that includes the pixel closest to the abovementioned pixel of interest (among the abovementioned plurality of sets of frame information). Still images with a high image quality can be obtained by means of a simple construction from a plurality of sets of frame information in video information. Especially in cases where the precision with which the movements of the individual frames is estimated is good, high-definition, high-resolution images can be obtained.

Furthermore, the abovementioned synthesizing module may also have a construction in which the abovementioned interpolation processing is performed using frame information that includes pixels located within a specified range that uses the abovementioned pixel of interest as a reference (among the abovementioned plurality of sets of frame information). Consequently, in cases where the precision with which the movements of the individual frames is estimated is not good, the deviation of the images can be made inconspicuous, so that the image quality of the still images can be improved.

Here, the abovementioned synthesizing module may also perform the abovementioned interpolation processing by sets of frame information using frame information that includes pixels located within a specified range that uses the abovementioned pixel of interest as a reference (among the abovementioned plurality of sets of frame information), and may produce the abovementioned image data by summarizing the respective sets of halftone data following this interpolation processing. Accordingly, in cases where the precision with which the movements of the individual frames is estimated is not good, the image quality of the still images can be improved by means of a simple construction.

Furthermore, various constructions such as arithmetical averaging, geometrical averaging, harmonic averaging (use of the reciprocal of the arithmetical mean of the reciprocals of the halftone data), averaging with different weighting for the respective sets of halftone data or the like are conceivable as constructions for the averaging of the respective sets of halftone data following the interpolation processing.

Furthermore, in cases where pixels of the abovementioned frame information are not present within a specified range using the abovementioned pixel of interest as a reference, the abovementioned synthesizing module may perform the abovementioned interpolation processing using any of the abovementioned plurality of sets of frame information. Accordingly, image data can be reliably produced.

Furthermore, the abovementioned synthesizing module may also have a construction n which the abovementioned interpolation processing is performed for each of the abovementioned plurality of sets of frame information, and the abovementioned image data is produced by summarizing the respective sets of halftone data following this interpolation processing. Since pixels are present in the form of a lattice in each frame, still images with a high image quality can be obtained by utilizing interpolation processing with good precision such as processing performed by the by-cubic method or the like.

Here, various constructions such as arithmetical averaging, geometrical averaging, harmonic averaging, averaging with different weighting for the respective sets of halftone data, summing or the like are conceivable as the construction used to summarize the respective sets of halftone data.

The present invention can also be applied to an image deviation amount detection device. Specifically, the deviation amount acquisition module detects an amount of rotation that expresses the rotational deviation among images expressed by a plurality of sets of frame information on the basis of this frame information which is acquired by the frame acquisition module. Accordingly, if a plurality of sets of frame information are synthesized using the detected amount of rotation, still images with a high image quality can be obtained from a plurality of sets of frame information in video information.

The abovementioned image producing device and image deviation amount detection device include various aspects as concepts of the present invention, and may be appropriately altered; e. g., these devices may be used independently in some cases, or may be used together with other methods in a state in which these devices are incorporated into certain types of equipment.

Furthermore, the present invention is also found in the methods used to perform processing corresponding to the abovementioned module in accordance with a specified procedure. Accordingly, the present invention can also be applied as a control method for an image producing device or image deviation amount detection device.

Furthermore, the present invention can also be applied as a printing control device which performs printing control of a printer that performs printing on the basis of the produced image data, and can be further applied as a printing system comprising such as printing control device and printer; in such cases, the effect of the invention is basically the same.

In the working of the present invention, there may also be cases in which specified programs are executed by the abovementioned devices. Accordingly, the present invention can also be applied as control programs for an image producing device or image deviation amount detection device. Furthermore, recording media which record such programs are commonly used, and it is conceivable that such programs may be appropriately read into a computer from such recording media. Specifically, the present invention can also be applied as a computer-readable recording medium on which such programs are recorded; in this case, the effect of the present invention is basically the same.

Here, besides a magnetic recording medium or optical-magnetic recording medium, the abovementioned recording medium may be any type of recording medium that might be developed in the future. Furthermore, the stage of duplication may be any stage of duplication such as a primary duplicated product, secondary duplicated product or the like. Cases in which portions of the program are realized by hardware, and cases in which portions of the program are recorded on a recording medium and appropriately read in as required, are also included in the concept of the present invention.

These and other objects, features, aspects, and advantages of the present invention will become more apparent from the following detailed description of the preferred embodiments with the accompanying drawings.

BRIEF DESCRIPTION OF THE DRAWINGS

FIG. 5 is a diagram which shows the translational deviation amount and rotational deviation amount in model form;

FIG. 7 is a diagram which shows the conditions of the estimation of the translational movement correction amount by the gradient method in model form;

FIG. 20 is a diagram which shows the conditions of the processing performed by the image producing device in a modification in model form.

DESCRIPTION OF THE PREFERRED EMBODIMENTS

Figure 1:
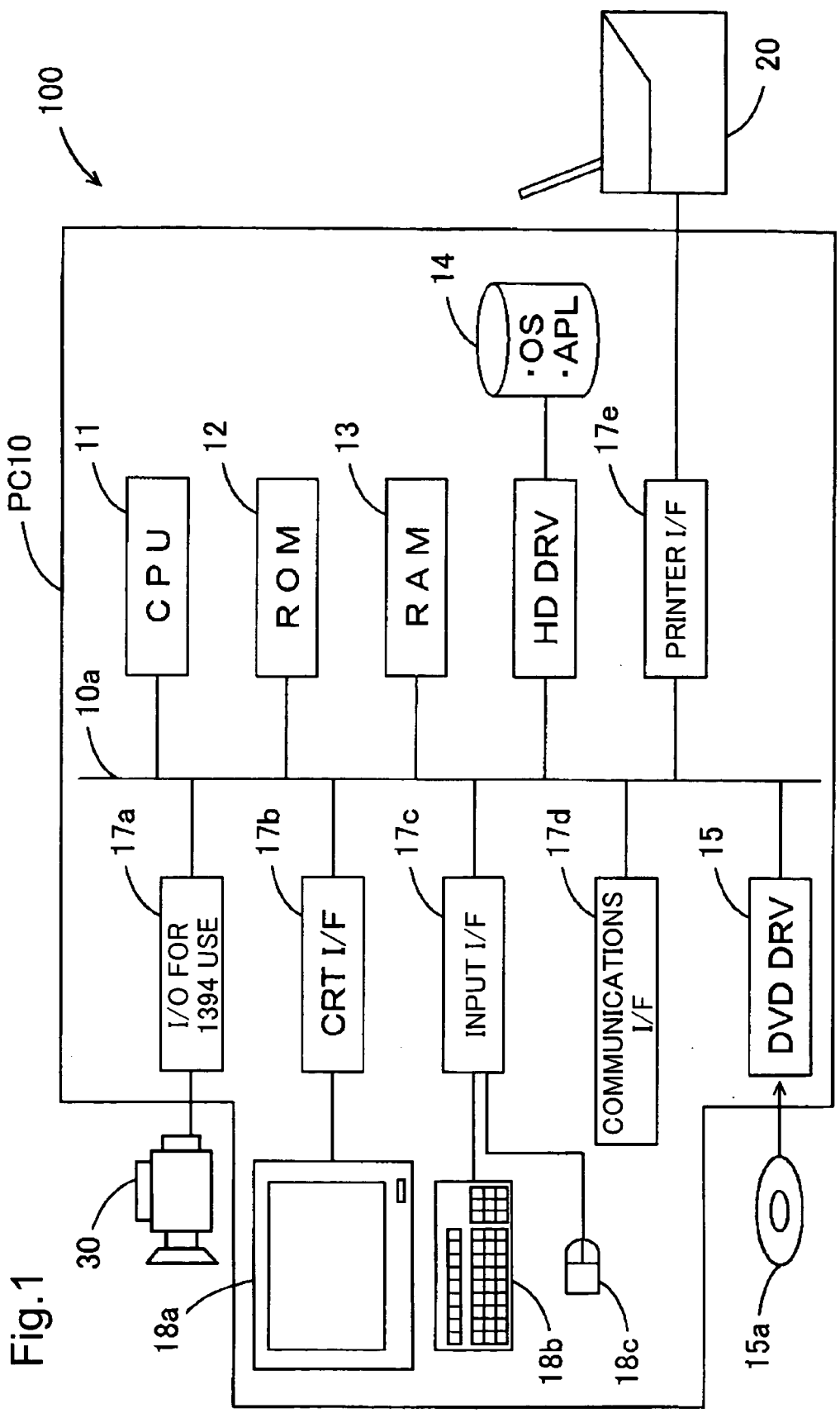
FIG. 1 is a diagram which shows the schematic construction of the printing system.

Below, embodiments of the present invention will be described in the following order:
(1) Construction of Printing System
(2) Outline of Construction of Image Producing Device and Image Deviation Amount Detection Device
(3) Estimation of Camera Motion
(4) Processing Performed by Image Producing Device and Image Deviation Amount Detection Device
(4-1) Cutting Out of Synthesis Range
(4-2) Detection of Translational Movement Correction Amount and Rotational Correction Amount
(4-3) Frame Image Deviation Correction
(4-4) Synthesis of Frame Images—Part 1
(4-5) Synthesis of Frame Images—Part 2
(4-6) Synthesis of Frame Images—Part 3
(5) Embodiments (1) Construction of Printing System FIG. 1 shows the schematic construction of a printing system 100 constituting one embodiment of the present invention. This system 100 is constructed from a personal computer (PC) 10, an ink jet printer 20 which is a printing device that is capable of color printing, and the like. Furthermore, the PC 10 constitutes the image producing device referred to in the present invention in the sense that this PC produces image data that expresses still images from a plurality of sets of frame information in video information, and likewise constitutes the image deviation amount detection device referred to in the present invention in the sense that this PC detects an amount of rotation that expresses the rotational deviation among images from the abovementioned plurality of sets of frame information. Furthermore, this PC also constitutes a printing control device in the sense that this PC produces image data and causes the printer 20 to print corresponding still images.

The PC 10 comprises a CPU 11 which constitutes the center of operational processing; this CPU 11 controls the PC 10 as a whole via a system bus 10a. A ROM 12, RAM 13, DVD-ROM drive 15, 1394 I/O 17a, various types of interfaces (I/F) 17b through 17e and the like are connected to this bus 10a. Furthermore, a hard disk (HD) 14 is also connected via a hard disk drive. A desktop PC is used as the computer in the present embodiment; however, any computer with a common construction can be used as this computer.

An operating system (OS) and an application program (APL) which can create image information and the like are stored on the HD 14. At the time of execution, the CPU 11 sends this software to the RAM 13 as appropriate, and the program is executed while appropriately accessing the RAM 13 as a temporary work area.

The 1394 I/O 17a is an I/O that conforms to the IEEE 1394 standard, and a digital video camera 30 or the like is connected to this I/O. This video camera 30 can produce video information and output this video information to the PC 10. A display 18a which displays images on the basis of frame information and image data is connected to the CRT I/F 17b, and a keyboard 18b and mouse 18c are connected to the input I/F 17c as operating input devices. Furthermore, the printer 20 is connected to the printer I/F 17e via a parallel I/F cable. Of course, a construction in which the printer 20 is connected via a USB cable or the like may also be used.

Using C (cyan), M (magenta), Ye (yellow) and K (black) inks, the printer 20 causes ink to jet onto printing paper (a printing medium) so that the amounts of ink correspond to the halftone values that form the image data; in this way, the printer 20 prints images. Of course, it would also be possible to employ a printer that uses inks other than inks of four colors. Furthermore, various types of printing devices such as laser printers, bubble type printers that cause the ink to jet by generating bubbles in the ink passages or the like may be employed.

Figure 2:
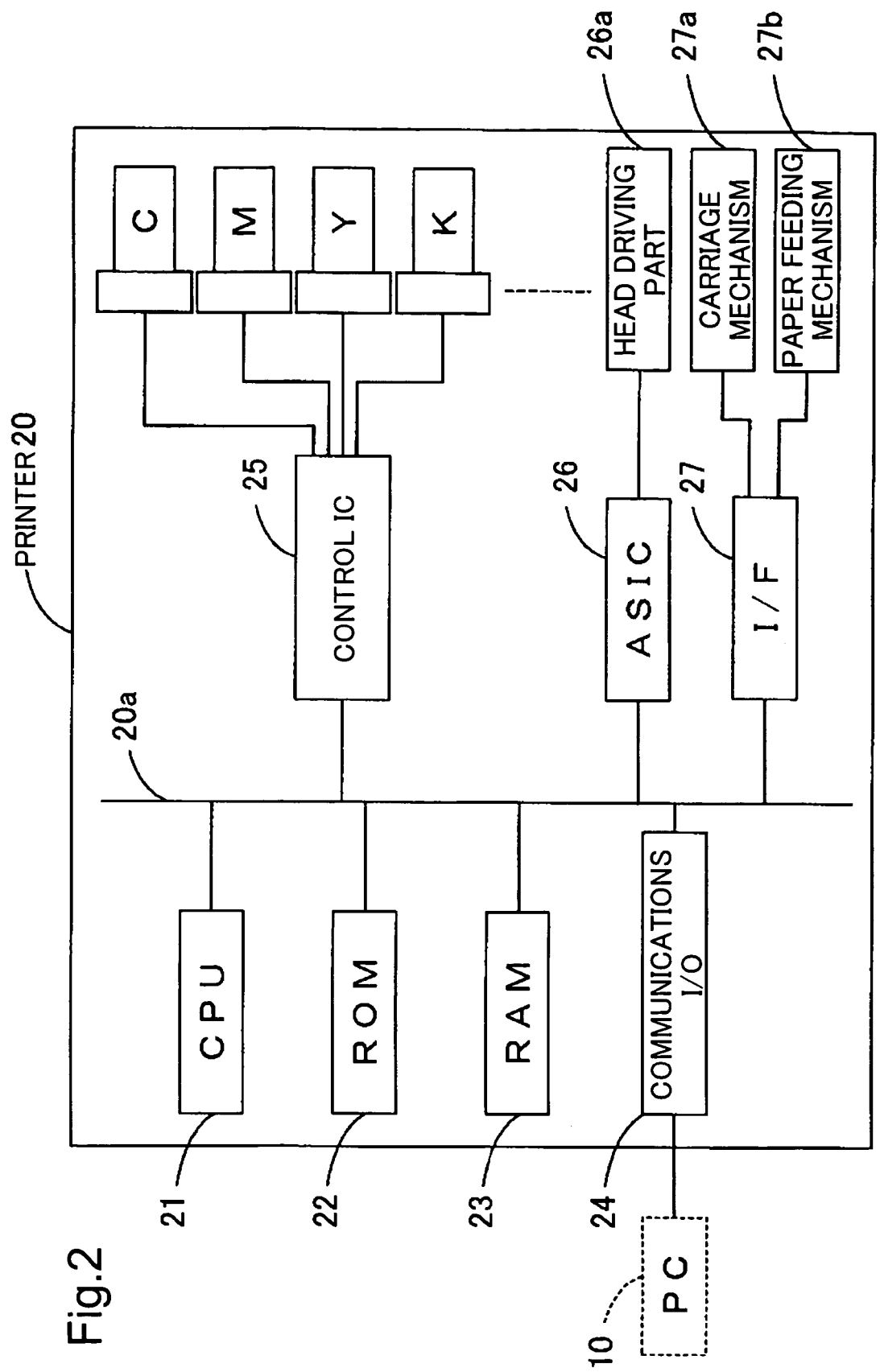
FIG. 2 is a block diagram which shows the construction of the printer.

In the printer 20, as is shown in FIG. 2, a CPU 21, ROM 22, RAM 23, communications I/O 24, control IC 25, ASIC 26, I/F 27 and the like are connected via a bus 20a. The communications I/O 24 is connected to the printer I/F 17e of the PC 10, so that the printer receives printing jobs comprising data converted into CMYeK, a page description language and the like that is transmitted from the PC 10 via the communications I/O 24. The ASIC 26 outputs applied voltage data based on the CMYeK data to the head driving part 26a while transmitting and receiving specified signals to and from the CPU 21. This head driving part 26a produces an applied voltage pattern that is applied to piezoelectric elements contained in the printing head on the basis of this applied voltage data, and causes the printing head to jet CMYeK inks. The carriage mechanism 27a and paper feeding mechanism 27b connected to the I/F 27 cause the printing head to perform a main scan, and a sub-scan is performed by successively feeding out the medium while performing an appropriate page changing operation. Furthermore, the CPU 21 controls various parts in accordance with a program written into the ROM 22 while utilizing the RAM 23 as a work area.

In the PC 10, BIOS is executed using the abovementioned hardware as a foundation, and the OS and APL are executed on a higher level. Various types of drivers may be incorporated into the OS as printer drivers that control the printer I/F 17e or the like, and hardware control can be performed in this manner. Such printer drivers can perform two-way communications with the printer 20 via the printer I/F 17e; these drivers receive image data from the APL, prepare printing jobs, and send these jobs out to the printer 20. The image production program and image deviation amount detection program of the present invention are constructed from APL, but may also be constructed by printer drivers. Furthermore, the HD 14 is a medium on which these programs are recorded; however, this medium may also be (for example) a DVD-ROM 15a, CD-ROM, flexible disk, optical-magnetic disk, nonvolatile memory, punch cards or a printed medium on which symbols such as a bar code or the like are printed. Of course, the abovementioned programs stored in a specified server may also be downloaded from the communications I/F 17d via the internet, and then executed.

Furthermore, the abovementioned hardware and the abovementioned programs may be used in conjunction to construct an image producing device and image deviation amount detection device.

Figure 3:
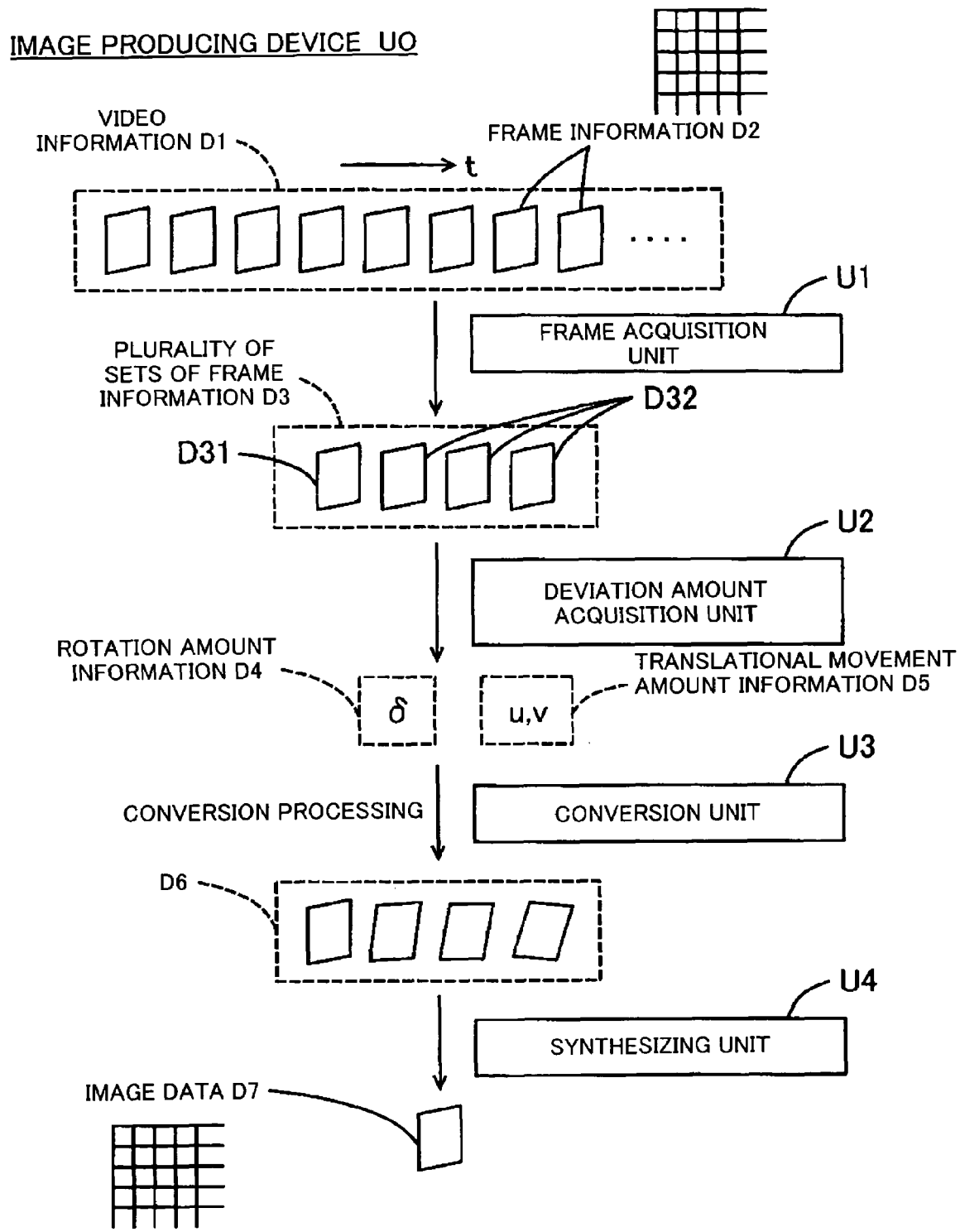
FIG. 3 is a diagram which shows the schematic construction of the image producing device in model form.

(2) Outline of Construction of Image Producing Device and Image Deviation Amount Detection Device FIG. 3 shows the schematic construction of the abovementioned image producing device in model form. The image production program that causes the PC to function as an image producing device U0 is constructed from a plurality of modules corresponding to the respective types of module described below.

The video information D1 is constructed from numerous sets of frame information D2 that express frame images in halftones by means of numerous pixels in the form of a dot matrix. These sets of frame information D2 constitute information that is continuous in a time series. In the figures, the order of the time series is shown from left to right, i. e., information is shown as later information in time series order as this information is located further toward the right side. The frame acquisition module U1 acquires a plurality of sets of frame information D3 that is continuous in a time series from the video information D1. In the present embodiment, the first set of frame information in time series order is designated as reference frame information D31, and the sets of frame information that follow this reference frame information (three sets in the example shown in the figures) are designated as object frame information D32. Of course, any set of frame information among the plurality of sets of frame information may be used as reference frame information. The reference frame information need not be information of the acquired plurality of sets of frame information.

Figure 4:
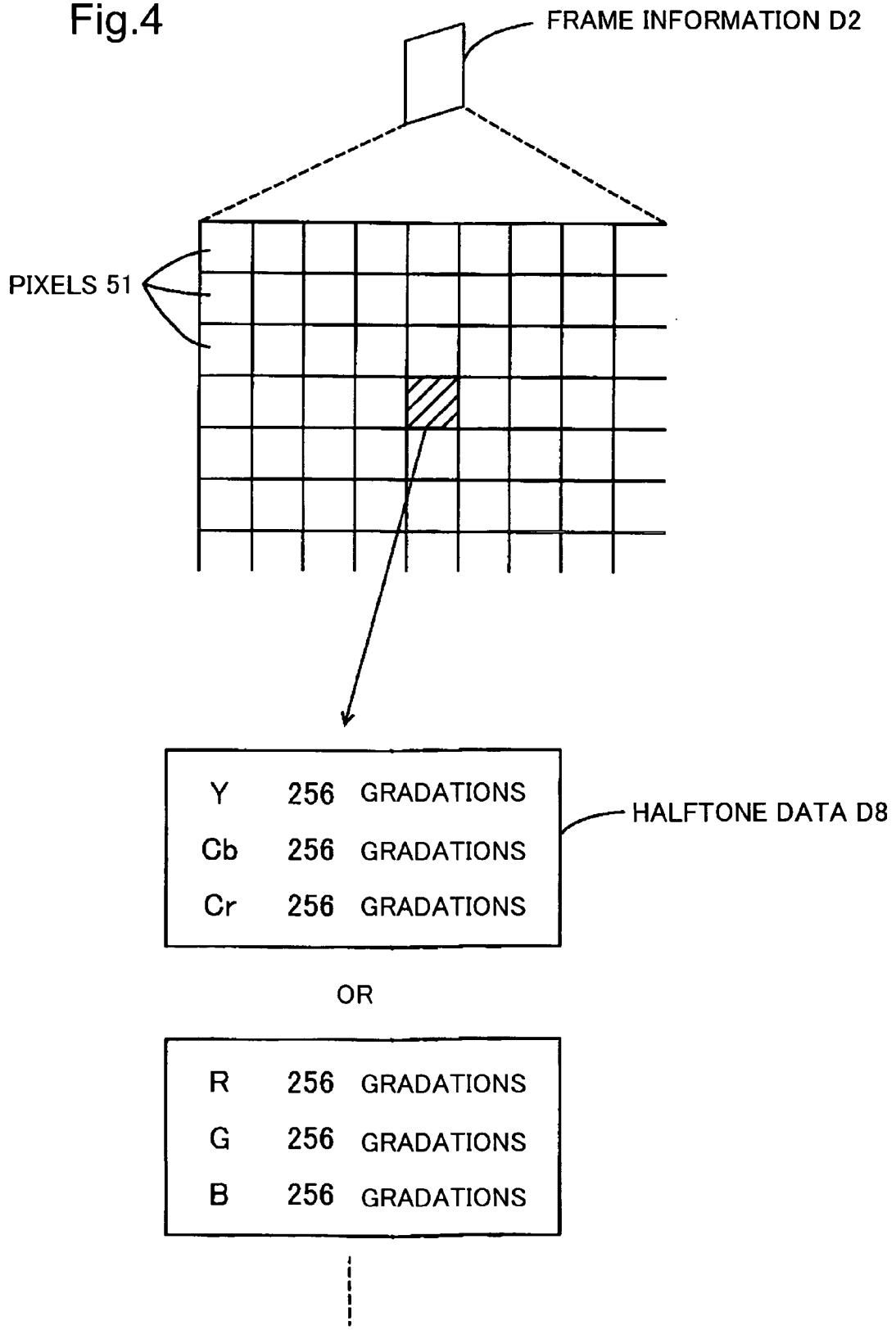
FIG. 4 is a diagram which shows the construction of the frame information in model form.

FIG. 4 shows the construction of the frame information D2 in model form. As is shown in the figure, each set of frame information D2 expresses a frame image by halftone data D8 for numerous pixels 51 in the form of a dot matrix. The halftone data D8 in the present embodiment is described as YCbCr data comprising Y (brilliance), Cb (blue chrominance difference) and Cr (red chrominance difference); however, this data may also be RGB data comprising R (red), G (green) and B (blue) or the like. Furthermore, the respective YCbCr components are described as comprising 256 gradations; however, these components may also have 1024 gradations, 100 gradations or the like.

On the basis of the plurality of sets of frame information D3, the deviation amount acquisition module U2 detects the amount of rotational correction and amount of translational movement correction which are correction amounts that are used to correct the amount of rotational deviation that expresses the rotational deviation among the images expressed by the plurality of sets of frame information, and the amount of translational movement deviation that expresses the translational movement deviation among these images (this module correspond to the deviation amount detection module referred to in the present invention), and thus acquire rotation amount information D4 and translational movement amount information D5. In the present embodiment, this module is arranged so that the amount of rotational correction and amount of translational movement correction are detected for each of the sets of object frame information D32 following the initial reference frame information D31 in time series order; however, the rotational correction amount and translational movement correction amount can be detected in various ways in regard to which of the sets of frame information is used as reference frame information and the like.

Here, the relationship between the amount of deviation and the amount of correction will be described with reference to FIG. 5. As is shown in FIG. 5, numerous pixels of the frame information are expressed on the xy plane; the upper sets of frame information 52a and 52b are arranged in time series order, and the lower sets of frame information 52c and 52d are also arranged in time series order. As is shown in the upper part of the figure, the amount of movement ua (=1 pixel) in the direction of the x axis and the amount of movement va (=2 pixels) in the direction of the y axis when the object 53a on the frame information 52a is caused to undergo parallel movement without being rotated are translational movement deviation amounts. Furthermore, as is shown in the lower part of the figure, the amount of movement when the object 53c on the frame information 52c rotates about the center 52c1 of the frame image 52c in a case where the translational movement deviation amounts (ua, va) are (0, 0) is a rotational deviation amount (δa). In this case, in regard to the amounts of correction that are used to eliminate these deviations, if the amount of rotational correction is designated as "δ" and the amounts of translational movement correction are designated as "u" in the case of the horizontal direction and "v" in the case of the vertical direction, then the relationship between the amount of rotational deviation and amount of rotational correction can be expressed as δ=−δa , and the relationships between the amounts of translational movement deviation and amounts of translational movement correction can be expressed as u=−ua and v=−va. Furthermore, the amount of rotational correction δ constitutes the rotation amount information referred to in the present invention, and the amounts of translational movement correction (u, v) constitute the translational movement amount information referred to in the present invention.

The deviation amount acquisition module U2 of the present embodiment is devised so that this module determines, on the basis of the positions of the pixels of the plurality of sets of frame information D3 and the halftone data for these pixels, the rotational deviation and translational movement deviation among images expressed by the plurality of sets of frame information using calculation formulae for determining this rotational deviation and translational movement deviation by the method of least squares, and thus acquire rotation amount information D4 and translational movement amount information D5. The procedure used to determine this rotational deviation and translational movement deviation is called "estimation of camera motion".

On the basis of the rotation amount information D4 and translational movement amount information D5, the conversion module U3 performs conversion processing in which at least one of the plurality of sets of frame information D3 is converted by causing rotation or translational movement of at least one of the respective images expressed by the plurality of sets of frame information D3 so that the rotational deviation or translational movement deviation among the images is reduced. The conversion module U3 of the present embodiment converts at least one of the plurality of sets of frame information D3 (in concrete terms, the object frame information D32) so that the deviation among the images is eliminated, and thus produces a plurality of sets of frame information D6 that have been subjected to this conversion processing. In this case, the positions of the respective pixels of at least one of the plurality of sets of frame information are converted in units that are finer than these pixels.

Here, in cases where there is a second frame image following the first frame image, if the amounts of translational movement deviation from the first frame image to the second frame image are designated as (ua, va) and the amount of rotational deviation is designated as (δa), then, in a case where the deviation of the second frame image with respect to the first frame image is to be eliminated, the second frame image is caused to undergo translational movements of (−ua, −va) and a rotational movement of (−δa). Furthermore, in a case where the deviation of the first frame image with respect to the second frame image is to be eliminated, this can be accomplished by causing the first frame image to undergo translational movements of (ua, va) and a rotational movement of (δa). Of course, it would also be possible to cause the first frame image to undergo translational movements of (ua/2, va/2) and a rotational movement of (δa/2), and to cause the second frame image to undergo translational movements of (−ua/2, −va/2) and a rotational movement of (−δa/2).

The synthesizing module U4 produces image data D7 by synthesizing the plurality of sets of frame information D6 on which conversion processing has been performed. This image data is data that expresses still images in halftones by means of numerous pixels in the form of a dot matrix. The image data D7 in the present embodiment is described as RGB data with 256 RGB gradations; however, this data may also be YCbCr data or the like, and the number of gradations may be 1024 gradations, 100 gradations or the like. The image data in the present embodiment is described as data in which the number of pixels is different from that of the frame information; the number of pixels is increased compared to that of the frame information, so that the resolution of the data is increased. However, the image data that is produced may have the same number of pixels as the frame information, or may have a smaller number of pixels than the frame information.

When a plurality of sets of frame information are synthesized, the halftone value of the pixel of interest that produces the image data is determined by performing specified interpolation processing using the halftone data for pixels that are present in the area surrounding the pixel of interest (among all of the pixels of the plurality of sets of frame information) while successively moving this pixel of interest, so that image data D7 that expresses still images in halftone values by individual pixels is produced.

In conventional techniques, only the translational movement deviation in the horizontal direction and vertical direction among frame images is corrected when still images are synthesized from a plurality of frame images; accordingly, manual blurring which includes diagonal components as well cannot be sufficiently corrected. Since the still images expressed by the image data produced by the present image producing device U0 are produced by synthesis from a plurality of frame images with the rotational deviation eliminated along with the translational movement deviation among the plurality of frame images, manual blurring including diagonal components is corrected. Accordingly, still images with a high image quality can be obtained from a plurality of sets of frame information in video information, and one scene from a moving image can be expressed as a high-resolution still image, so that the definition can be increased in the case of printing.

(3) Estimation of Camera Motion

Next, the estimation of the camera motion that is performed by the deviation amount acquisition module and deviation amount detection module will be described. The "estimation of the camera motion" refers to a process that estimates the relative positional relationship of a plurality of frame images expressed by a plurality of sets of frame information cut out from the video information. Here, it is assumed that there is no movement of the object of imaging itself or the set position of the video camera during imaging, so that only the orientation of the video camera varies. Specifically, this corresponds to camera work called "panning" and "tilting". Furthermore, in order to describe this in a clearly understandable manner, it is assumed that there are object frame images expressed by object frame information following the reference frame image expressed by reference frame information, and it is assumed that the amount of deviation between the reference frame image and object frame images is estimated.

Figure 6:
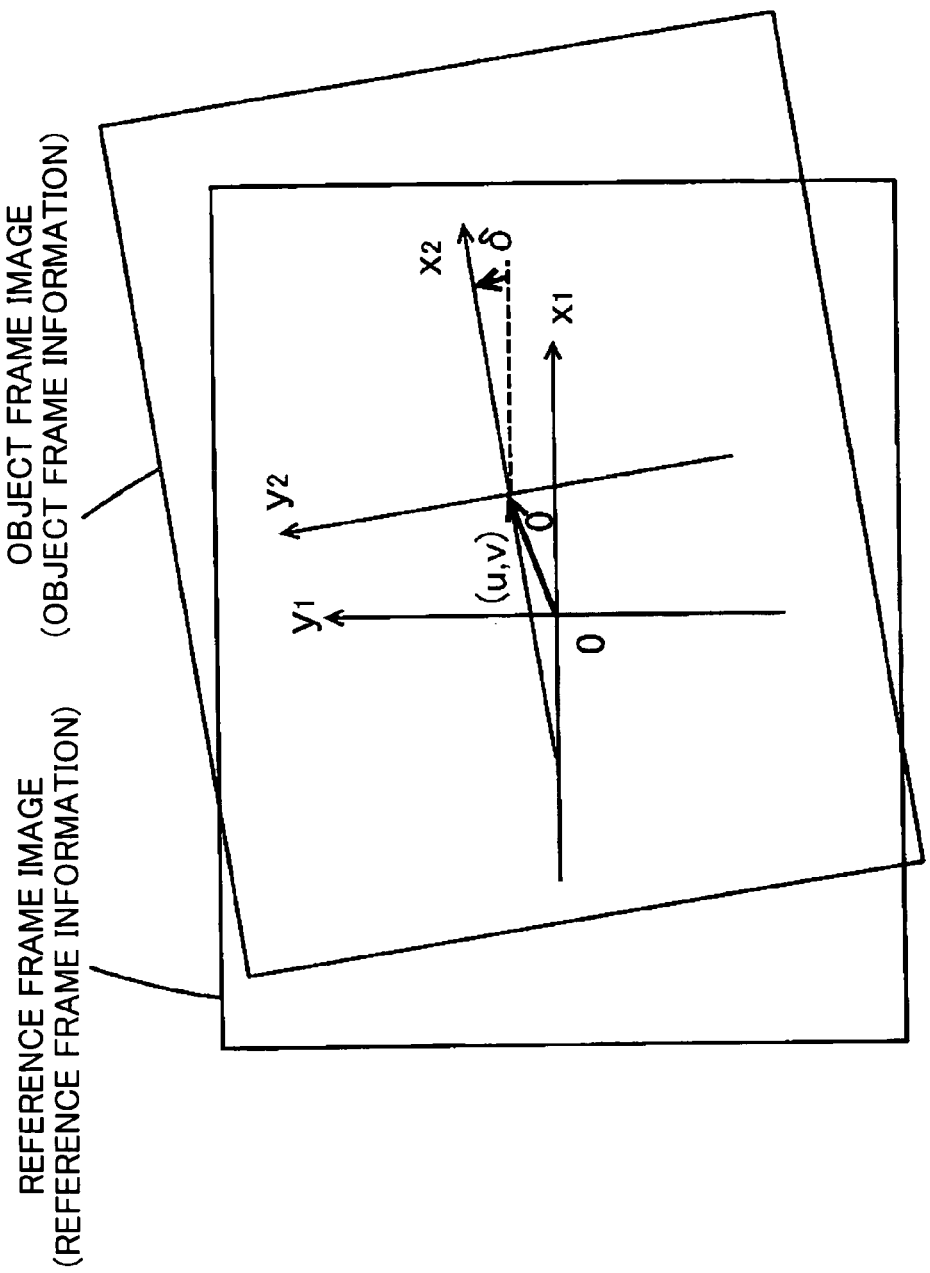
FIG. 6 is a diagram which shows the conditions of superimposition of the reference frame image and object frame images in model form.

It is assumed that the coordinates (x1, y1) of the reference frame information correspond to the coordinates (x2, y2) of the object frame information, as shown in FIG. 6. The translational movement correction amounts are designated as (u, v), and the rotational correction amount is designated as δ with the center of the frame image as the origin. Since it is assumed that the focal distance is not varied during imaging, the following equations are used as coordinate conversion equations, with conversion of only translational movement and rotation being taken as a prerequisite.

$$x2 = \cos\delta \cdot x1 + \cos\delta \cdot y1 - u \qquad (1)$$

$$y2 = -\sin\delta \cdot x1 + \cos\delta \cdot y1 - v \qquad (2)$$

$$x1 = \cos\delta \cdot (x2+u) - \sin\delta \cdot (y2+v) \qquad (1a)$$

$$y1 = \sin\delta \cdot (x2+u) + \cos\delta \cdot (y2+v) \qquad (2a)$$

Furthermore, since the time difference between the reference frame image and the object frame images is extremely small, u, v and δ are extremely small quantities. Here, since cos δ≈1 and sin δ≈δ when δ is an extremely small quantity, the above equations can be replaced by the following equations:

$$x2 = x1 + \delta \cdot y1 - u \qquad (3)$$

$$y2 = -\delta \cdot x1 + y1 - v \qquad (4)$$

$$x1 = (x2+u) - \delta \cdot (y2+v) \qquad (3a)$$

$$y1 = \delta \cdot (x2+u) + (y2+v) \qquad (4a)$$

Furthermore, u, v and δ in Equations (3) and (4) (or (3a) and (4a)) can be estimated by the method of least squares.

The estimation of the camera motion is based on the gradient method, in which the positions of the pixels are estimate in units finer than 1 pixel using (for example) the brilliance of the respective pixels among the sets of frame information.

Here, as is shown in the upper part of FIG. 7, the brilliance values of the respective pixels of the reference frame information are expressed as z1(ix, iy), and the brilliance values of the respective pixels of the object frame information are expressed as z2(ix', iy').

First, assuming that the coordinates (ix', iy') of the object frame information are between the coordinates (ix~ix+1, iy~iy+1) of the reference frame information, the procedure used to determine the coordinates (ix', iy') by the gradient method will be described.

As is shown in the middle part of the figure, if the position of the coordinates (ix', iy') in the direction of the x axis is designated as ix+Δx, and it is assumed that Px=z1(ix+1, iy)−z1(ix, iy), then it is sufficient to determine a value for Δx which is such that Px×Δx=z2(ix', iy')−z1(ix, iy). In actuality, Δx is determined for each pixel, and is average overall. Here, if the simple expressions of z1=z1(ix, iy) and z2=z2(ix', iy') are used, then it is sufficient to calculate a value of Δx which is such that the following equation holds true:

$$\{Px \cdot \Delta x - (z2-z1)\}^2 = O \quad (5)$$

Furthermore, as is shown in the bottom part of the figure, it the position of the coordinates (ix', iy') in the direction of the y axis is designated as iy+Δy, and it is assumed that Py=z1(ix, iy+1)−z1(ix, iy), then it is sufficient to determine a value for Δy which is such that Py·Δy=z2(ix', iy')−z1(ix, iy). Here as well, if the simple expressions of z1=z1(ix, iy) and z2=z2(ix', iy') are used, then it is sufficient to calculate a value of Δy which is such that the following equation holds true:

$$\{Py \cdot \Delta y - (z2-z1)\}^2 = O \quad (6)$$

Accordingly, if both the x and y directions are considered, it is sufficient to determine Δx and Δy which minimize $S^2$ in the following equation by the method of least squares.

$$S^2 = \Sigma \{Px \cdot \Delta x + Py \cdot \Delta y - (z2-z1)\}^2 \quad (7)$$

Above, a procedure in which the amount of translational movement correction was determined by the gradient method based on the assumption of parallel movement by the frame images in the direction of the x axis and direction of the y axis was described. In the present invention, the rotation of the frame images is also taken into account. The procedure used in this case will be described below.

Figure 8:
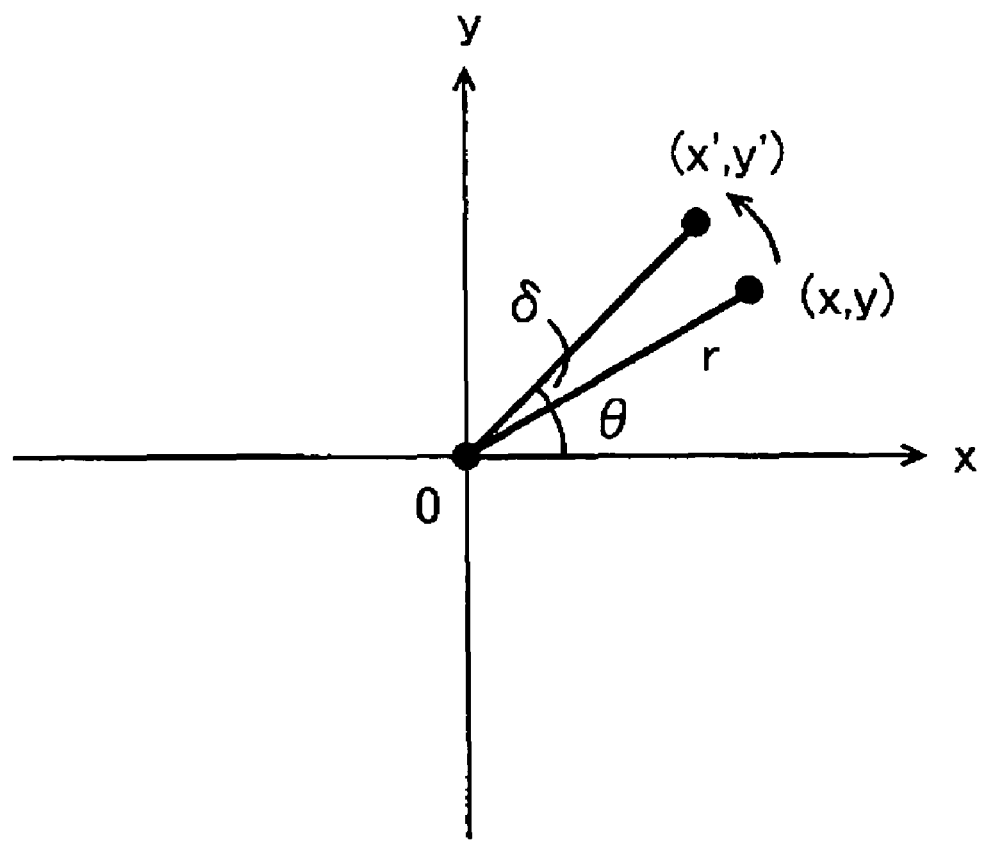
FIG. 8 is a diagram which shows the rotational correction amount of the pixels in model form.

As is shown in FIG. 8, if the distance of the coordinates (x, y) of the reference frame information from the origin O is designated as r, and the angle of rotation from the x axis is designated as θ, then r and θ can be determined by the following equations:

$$r = (x^2 + y^2)^{1/2} \quad (8)$$

$$\theta = \tan^{-1}(x/y) \quad (9)$$

Here, assuming that the translational movement deviation has been corrected, if the origins of the reference frame image and object frame image are aligned, and a rotation δ is performed from the coordinates (x, y) so that the coordinates (x', y') are obtained in the case of the object frame image, the amount of movement in the direction of the x axis and the amount of movement in the direction of the y axis caused by this rotation can be determined by the following equations:

$$x' - x \approx -r \, \delta \sin \theta = -\delta \cdot y \quad (10)$$

$$y' - y \approx r \, \delta \cos \theta = \delta \cdot x \quad (11)$$

Accordingly, Δx and Δy in the abovementioned Equation (7) can be expressed by the following equations using the translational movement correction amounts u and v and the rotational correction amount δ:

$$\Delta x = u - \delta \cdot y \quad (12)$$

$$\Delta y = v + \delta \cdot x \quad (13)$$

If these equations are substituted into the abovementioned Equation (7), the following equation is obtained:

$$S^2 = \Sigma \{Px \cdot (u - \delta \cdot y) + Py \cdot (v + \delta \cdot x) - (z2-z1)\}^2 \quad (14)$$

Specifically, if the coordinates of the reference frame information are designated as (ix, iy), and the coordinate values and halftone data (brilliance values) for all of the pixels of the reference frame information are substituted into Equation (14), then it is sufficient to determine u, v and δ that minimize $S^2$ by the method of least squares. The following equations can be obtained by the method of least squares:

$$u = \{(m_\delta \cdot M02 - m_v^2)c_u + \\ (m_u \cdot m_v - m_\delta \cdot M11)c_v + (m_v \cdot M11 - m_u \cdot M02)c_\delta\}/d \quad (15)$$

$$v = \{(m_u \cdot m_v - m_\delta \cdot M11)c_u + \\ (m_\delta \cdot M20 - m_u^2)c_v + (m_u \cdot M11 - m_v \cdot M20)c_\delta\}/d \quad (16)$$

$$\delta = \{(m_v \cdot M11 - m_u \cdot M02)c_u + \\ (m_u \cdot M11 - m_v \cdot M20)c_v + (M20 \cdot M02 - M11^2)c_\delta\}/d \quad (17)$$

Here, i is a number distinguishing all of the pixels, and α, β, D, N1 through N5 and M are determined as shown below.

$$Pt_i = z2 - z1 \quad (18)$$

$$k_i = x_i Py_i - y_i Px_i \quad (19)$$

$$M20 = \sum_i Px_i^2 \quad (20)$$

$$M11 = \sum_i Px_i Py_i \quad (21)$$

$$M02 = \sum_i Py_i^2 \quad (22)$$

$$m_u = \sum_i k_i Px_i \quad (23)$$

$$m_v = \sum_i k_i Py_i \quad (24)$$

$$m_\delta = \sum_i k_i^2 \quad (25)$$

$$c_u = \sum_i Px_i Pt_i \quad (26)$$

$$c_v = \sum_i Py_i Pt_i \quad (27)$$

$$c_\delta = \sum_i k_i Pt_i \quad (28)$$

$$d = m_\delta (M20 \cdot M02 - M11^2) - (m_u \cdot M02 - 2m_u \cdot M11 + m_v^2 \cdot M20) \quad (29)$$

Accordingly, the translational movement correction amounts (u, v) and rotational correction amount (δ) can be detected according to the camera motion using the abovementioned Equations (15) through (29), and these amounts can be acquired as translational movement amount information and rotation amount information. Here, since the translational movement correction amounts are designated in units smaller than the pixels of the frame images, detection can be performed with good precision. Furthermore, if a plurality of sets of frame information are synthesized using the detected translational movement correction amounts and rotational correction amount, then still images with a high image quality can be obtained from a plurality of sets of frame information in the video information.

Furthermore, the system may also be devised so that the translational movement correction amounts are detected in pixel units only for the translational movement deviation prior to the abovementioned estimation, and so that the translational movement deviation among the frame images is corrected in pixel units (i. e., roughly corrected) beforehand. If this is done, the translational movement amount information and rotation amount information can be acquired with even better precision, and still images with an even higher image quality can be obtained by synthesizing a plurality of frame images using this translational movement amount information and rotation amount information.

An estimation procedure using the pattern matching method is known as a procedure for roughly detecting the translational movement deviation among frame images.

Figure 9:
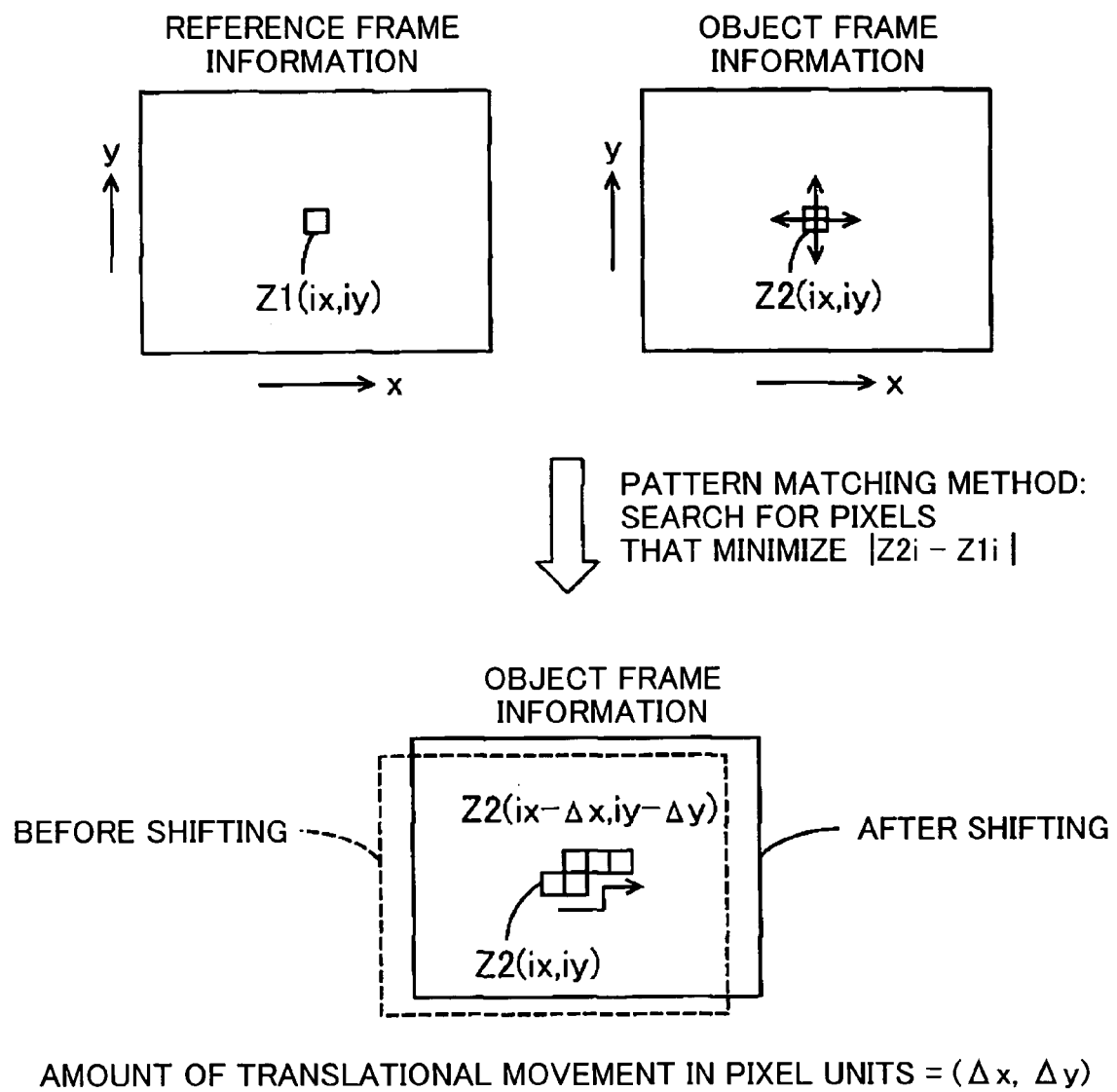
FIG. 9 is a diagram which shows the conditions of the estimation of the translational movement correction amount by the pattern matching method in model form.

FIG. 9 shows the conditions of estimation of the translational movement correction amount by the pattern matching method in model form.

As is shown in the upper part of the figure, the brilliance values of the respective pixels of the reference frame information are expressed as $z1(ix, iy)$, and the brilliance values of the pixels in the same positions in the object frame information are expressed as $z2(ix, iy)$.

First, using a case in which the pixel $(ix, iy)$ of the reference frame information is caused to correspond to the pixel $(ix, iy)$ of the object frame information as a reference, positions which are such that L shown below is minimized are determined for this case and for cases in which the abovementioned pixel is caused to correspond to the pixels $(ix+1, iy)$, $(ix-1, iy)$, $(ix, iy+1)$ and $(ix, iy-1)$ of the object frame information.

$$L=|Z2_i - Z1_i| \tag{30}$$

or $$L=(Z2_i - Z1_i)^2 \tag{31}$$

For example, when L of the pixel $(ix-1, iy)$ of the object frame information shows a minimum value, positions in which L shows a minimum value are determined for a case in which the pixel $(ix, iy)$ of the reference frame information is caused to correspond to the pixel $(ix-1, iy)$ of the object frame information, and for cases where this pixel is caused to correspond to the pixels $(ix, iy)$, $(ix-2, iy)$, $(ix-1, iy+1)$ and $(ix-1, iy-1)$ of the object frame information. Thus, a search for pixels of the object frame information where L shows a minimum value is repeated.

Furthermore, for example, when L of the pixel $(ix-3, iy-1)$ of the object frame information shows a minimum value, positions in which L shows a minimum value are determined for a case in which the pixel $(ix, iy)$ of the reference frame information is caused to correspond to the pixel $(ix-3, iy-1)$ of the object frame information, and for cases in which this pixel is caused to correspond to the pixels $(ix-2, iy-1)$, $(ix-4, iy-1)$, $(ix-3, iy)$ and $(ix-3, iy-2)$ of the object frame information. When L of the center pixel $(ix-3, iy-1)$ of the search shows a minimum value, the search is ended here. The shift of the object frame information at the time of completion of the search is (3, 1).

Generally, in cases where the position of the pixel of the object frame information that is caused to correspond to the pixel $(ix, iy)$ of the reference frame information at the time of completion of the search is $(ix-\Delta x, iy-\Delta y)$, the amount of translational movement correction from the reference frame image to the object frame image can be expressed as $(\Delta x, \Delta y)$ in pixel units.

Accordingly, if the pixels are shifted by the translational movement correction amount $(\Delta x, \Delta y)$ for the object frame information, the estimation of the camera motion can be performed with a high degree of precision.

(4) Processing Performed by the Image Producing Device and Image Deviation Amount Detection Device Below, the operation of the image producing device and image deviation amount detection device will be described in detail along with the processing performed by the image producing device and image deviation amount detection device.

Figure 10:
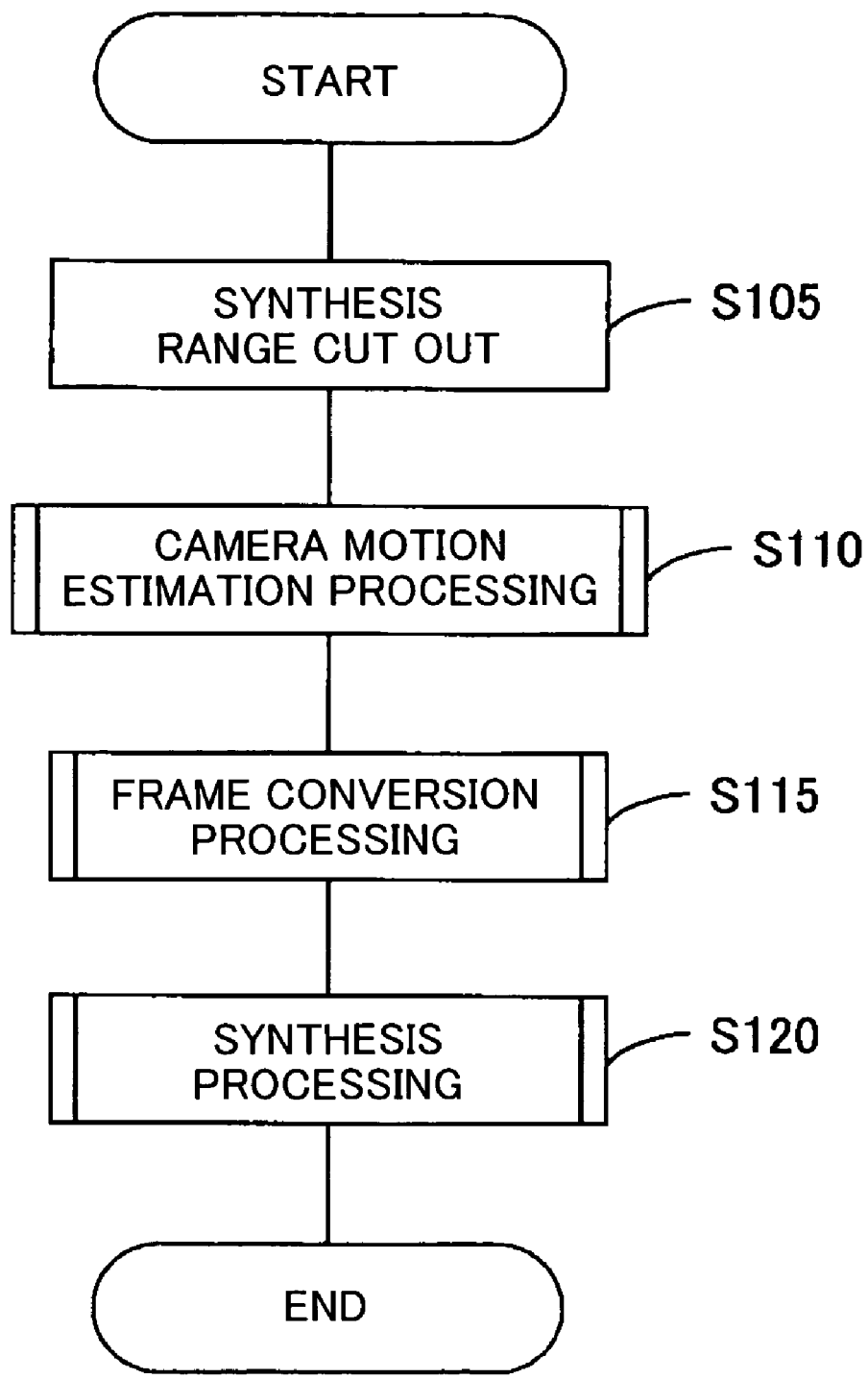
FIG. 10 is a flow chart which shows the processing performed by the image producing device.

FIG. 10 uses a flow chart to show the processing performed by this image producing device. In concrete terms, the CPU 11 of the PC 10 performs this processing.

(4-1) Cutting Out of Synthesis Range

First, a plurality of sets of frame information in the range that is to be synthesized are acquired by being cut out by the frame acquisition module from video information comprising numerous sets of frame information expressing images by YCbCr data (halftone data) for numerous individual pixels (step S105; "step" is hereafter omitted). There are no particular restrictions on the frame information that is cut out, as long as this information comprises two or more sets of frame information. In the present embodiment, the system is devised so that four sets of frame information that are continuous in a time series are acquired from the video information. However, even if a plurality of discrete sets of frame information that are not continuous in a time series are acquired, the translational movement correction amount and rotational correction amount can be detected, and frame information can be synthesized so that still images are obtained. For example, in cases where the video information is constructed from independent frame information which has halftone data for all of the pixels and which can express images without reference to other frame information, and non-independent frame information which does not have halftone data for all of the pixels and which cannot express images without reference to other frame information, the following camera motion estimation processing can be performed at a high speed by referring only to the discrete independent frame information.

Various positions are conceivable as the positions where frame information is cut out. For example, as is shown in FIG. 3, in cases where a specified key operation or button input operation is received while the playback of video from the video information is stopped, frame information that expresses the frame image that is temporarily stopped and displayed on the display (reference frame information D31), and a specified number of sets of frame information (object frame information D32) that follow the abovementioned frame information in time series order, can be acquired as cut-out frame information. Of course, frame information expressing a frame information that is temporarily stopped as displayed on the display, and a specified number of sets of frame information that precede the abovementioned frame information in time series order, may also be acquired as cut-out frame information.

(4-2) Detection of Translational Movement Correction Amount and Rotational Correction Amount Next, camera motion estimation processing which estimates the translational movement correction amount and rotational correction amount according to the camera motion and acquires translational movement amount information and rotation amount information is performed by the deviation amount acquisition module and deviation amount detection module (S110).

Figure 11:
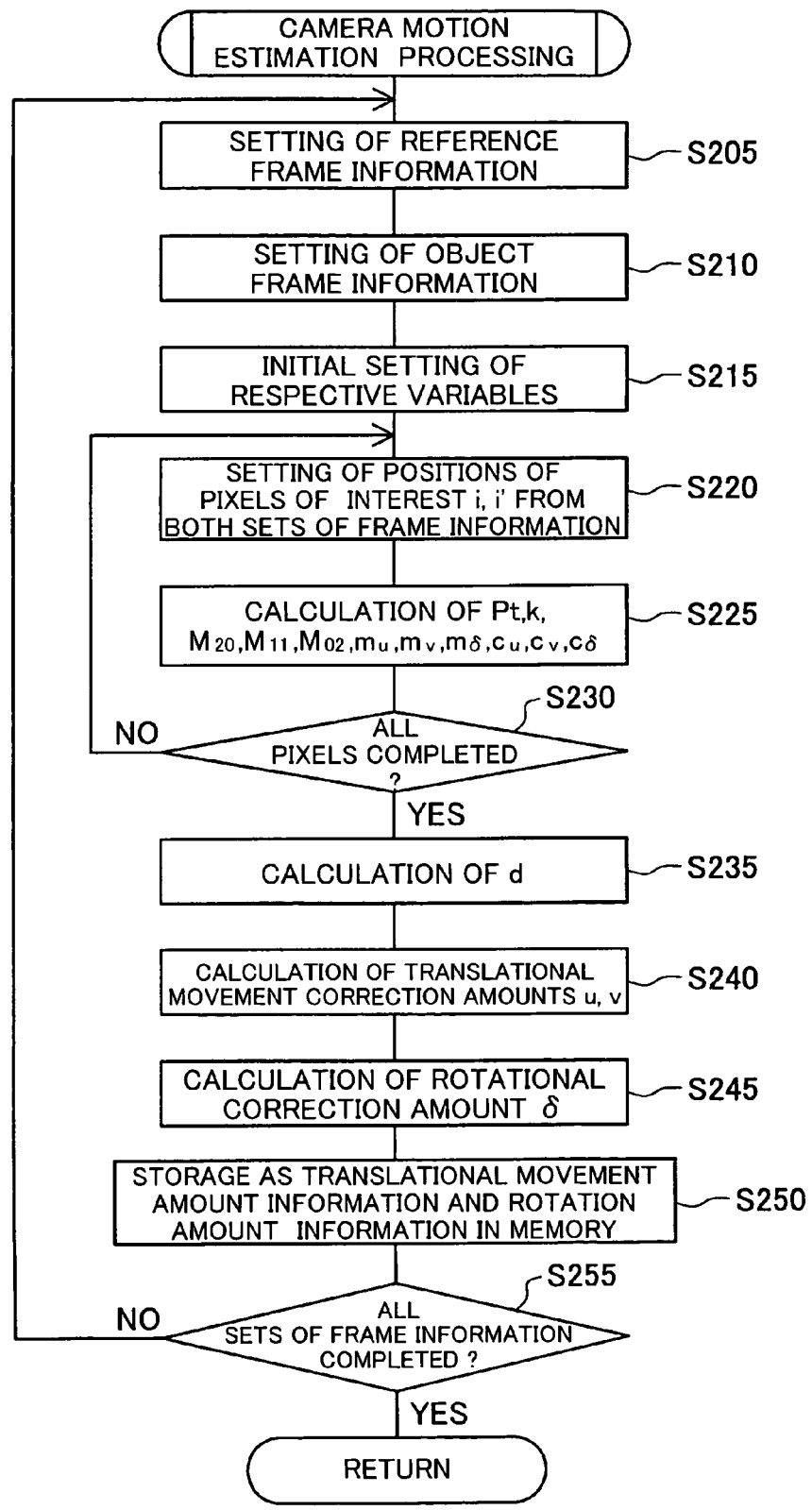
FIG. 11 is a flow chart which shows the camera motion estimation processing.

FIG. 11 shows the camera motion estimation processing by means of a flow chart.

First, reference frame information is set from a plurality of sets of frame information acquired from the video information (S205). In the present embodiment, the first set of frame information in time series order is set as the reference frame information. Here, the frame information used as reference frame information may be set by storing this frame information in a specified region of the RAM, or this frame information used as reference frame information may be set by storing the memory address of this frame information in a specified pointer in the RAM.

Next, the object frame information is set from the plurality of sets of frame information acquired from the video information (S210). In the present embodiment, since four sets of frame information are acquired, the object frame information is set from the frame information that remains after the reference frame information has been removed from these four sets of frame information. For example, the second set of frame information in time series order is set as the object frame information. Here as well, the frame information that is used as object frame information may be stored in a specified region of the RAM, or the memory address of the frame information used as object frame information may be stored in a specified pointer.

Furthermore, the respective variables (parameters) used in the abovementioned Equations (15) through (29) which are used to calculate the translational movement correction amounts u and v that correct the translational movement deviation and the rotational correction amount δ that corrects the rotational deviation by the method of least squares are initially set (S215). For example, 0 is substituted for the variables M20, M11, M02, $m_u$, $m_v$, $m_\delta$, $c_u$, $c_v$ and $c_\delta$ that are used for sum calculations.

Afterward, the position of the pixel of interest i is set from the reference frame information, and the position of the pixel of interest i' is set from the object frame information (S220). For example, in a case where the frame information is constructed in the form of a dot matrix comprising nx pixels in the horizontal direction (direction of the x axis) and ny pixels in the vertical direction (direction of the y axis), the position of the pixel of interest i can be set by i=ix+nx×iy when a pixel of coordinates (ix, iy) in the reference frame information is set as the pixel of interest, and the position of the pixel of interest i' can be set by i'=ix'+nx×iy' when a pixel of coordinates (ix', iy') in the object frame information is set as the pixel of interest. In the present embodiment, the order in which the positions of the pixels of interest are set begins from the pixel at the upper left, proceeds in order to the pixel at the upper right, and subsequently proceeds in order one at a time from the pixel at the left end below to the pixel at the right end, finally ending at the lower right pixel. The same is true when the positions of pixels of interest are set in various types of processing below. Of course, the order in which the positions of the pixels of interest are set may be appropriately altered, and different orders may be used in accordance with the type of frame images involved or the like.

Furthermore, a rough translational movement correction amount (Δx, Δy) from the reference frame image to the object frame image may be detected and acquired by the abovementioned pattern matching method, and the pixels may be subjected to a translational movement correction (Δx, Δy), prior to the processing of step S220.

When the positions of the pixels of interest i and i' are set, the values of $Pt_i$, $k_i$, M20, M11, M02, $m_u$, $m_v$, $m_\delta$, $c_u$, $c_v$ and $c_\delta$ used in the abovementioned Equations (18) through (28) are successively calculated (S225).

For example, in the case of M20, it is necessary to calculate a sum; accordingly, for the variable M20, processing that performs a calculation of $M20 \leftarrow M20+$(values of pixels of interest $i$ and $i'$ within $\Sigma$), i. e., processing that adds the values of the pixels of interest i and i' within Σ, is performed. The same is true regarding M11, M02, $m_u$, $m_v$, $m_\delta$, $c_u$, $c_v$ and $c_\delta$.

Then, a judgment is made as to whether or not the abovementioned variables have been calculated for all of the pixels of the reference frame information (S230). In cases where pixels for which the abovementioned variables have not been calculated remain, the processing of S220 through S230 is repeated while successively moving the pixels of interest i, i' for which the abovementioned variables are calculated. Then, when the abovementioned variables have been calculated for all of the pixels, the processing proceeds to S235.

In S235, d is calculated using the abovementioned Equation (29).

Next, the translational movement correction amounts u and v are calculated using the abovementioned Equations (15) and (16) (S240). Specifically, the translational movement correction amounts that correct the translational movement deviation among the images expressed by the plurality of sets of frame information are detected in units finer than 1 pixel, and translational movement amount information is acquired as translational movement correction amounts u, v that constitute numerical information.

Furthermore, the rotational correction amount δ is calculated using the abovementioned Equation (17). Specifically, the rotational correction amounts that correct the rotational deviation among the images expressed by the plurality of sets of frame information are detected in units finer than 1 pixel, and rotation amount information is acquired as a rotational correction amount δ that constitutes numerical information.

Then, u, v and δ are stored in a specified region of the RAM as translational movement amount information and rotation amount information (S250).

Afterward, a judgment is made as to whether or not u, v and δ have been acquired for all of the frame information (S255). In cases where there is remaining frame information for which u, v and δ have not been acquired, the processing of S205 through S255 is repeated. In the present embodiment, the first set of frame information in time series order is always set as the reference frame information, and the object frame information is set in time series order from the remaining frame information; then, the abovementioned translational movement amount information and rotation amount information are acquired using this frame information. When u, v and δ have been acquired for all of the frame information, the present flow is ended.

In the above processing the translational movement correction amounts (u, v) and rotational correction amount (δ)

are detected in accordance with the camera motion, and these data can be acquired as translational movement amount information and rotation amount information. In this case, since the conversion of the positions of the respective pixels of the frame information is performed with high precision in units finer than these pixels, still images with a high image quality can be obtained. Furthermore, since calculation formulae that correct the rotational deviation and translational movement deviation among the frame images by the method of least squares are used, the rotational correction amount and translational movement correction amounts can be detected at a high speed, so that the speed of the processing that produces the image data can be increased.

Furthermore, translational movement amount information and rotation amount information may also be obtained by multiplying u, v and δ by specified correction coefficients in accordance with the properties of the frame images or the like. Even if these correction coefficients are not 1, the translational movement amount information is information that can reduce the translational movement deviation among the images expressed by a plurality of sets of frame information, and the rotation amount information is information that can reduce the rotational deviation among the images expressed by a plurality of sets of frame information.

(4-3) Frame Image Deviation Correction

When the camera motion estimation processing is completed, the processing proceeds to S115 in FIG. 10, and conversion processing which converts the three sets of object frame information by causing the three object frame images expressed by the object frame information to rotate and undergo translational movement so that the translational movement deviation and rotational deviation with respect to the reference frame image is reduced is performed on the basis of the abovementioned translational movement amount information and rotation amount information by the conversion module.

Figure 12:
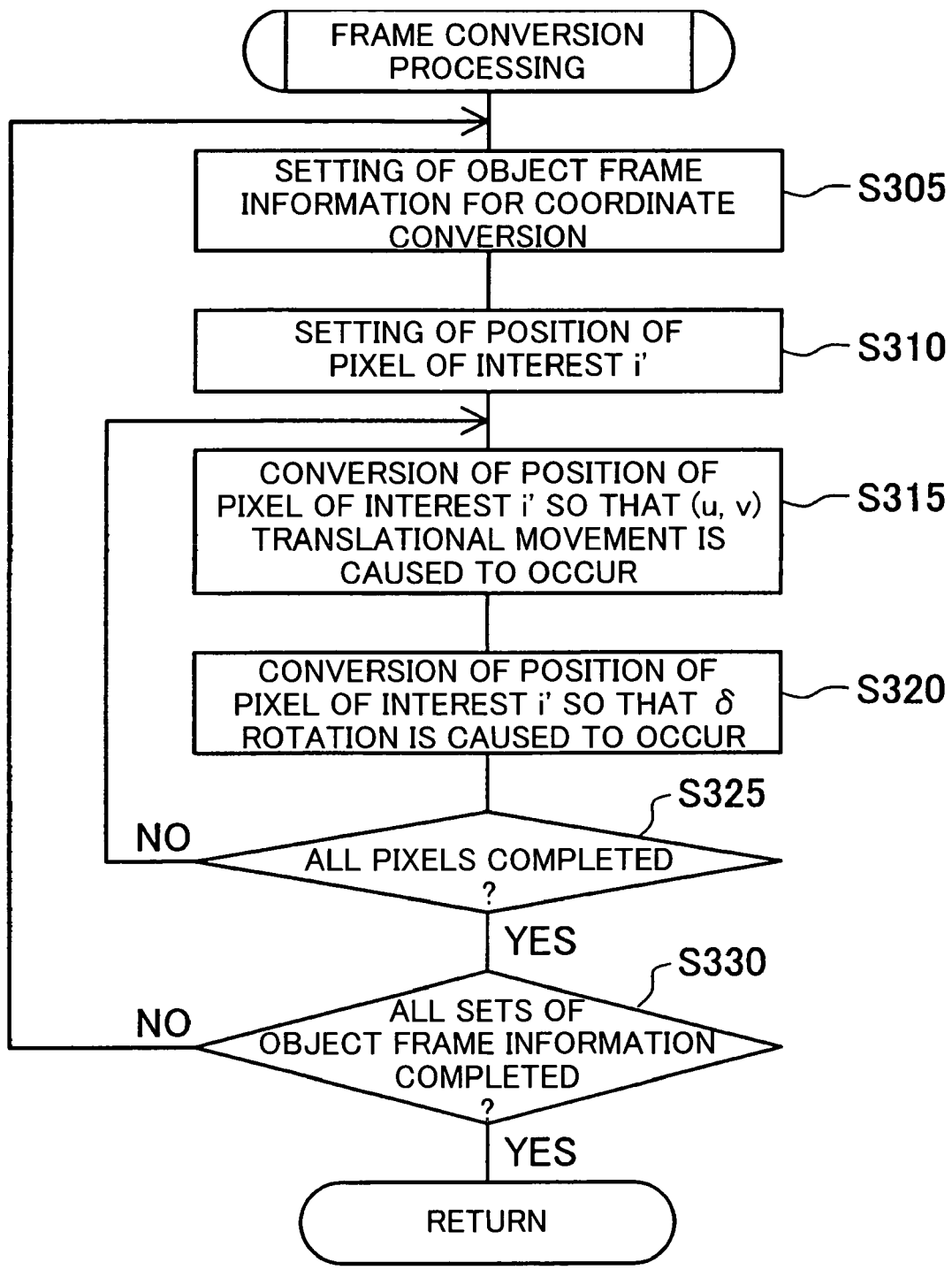
FIG. 12 is a flow chart which shows the frame conversion processing.

FIG. 12 shows the frame conversion processing by means of a flow chart.

First, the object frame information for which the coordinates of the pixels are to be converted are set from the object frame information (S305). In the present embodiment, the object frame information is set in time series order in the same manner as in S210 in FIG. 11.

Next, the position of the pixel of interest i' whose coordinates are to be converted is set from the object frame information (S310). In the present embodiment, the position of the pixel of interest i' is set in the same manner as in S220 in FIG. 11.

Subsequently, the translational movement correction amounts u and v are read out from the RAM, and the position of the pixel of interest i' is subjected to a coordinate conversion so that this pixel is caused to undergo a translational movement of u in the direction of the x axis and a translational movement of v in the direction of the y axis, thus canceling the translational movement deviation of the object frame image (S315). Specifically, the position of the pixel of interest i' with coordinates of (ix', iy') is caused to undergo a parallel movement to the coordinates (ix'+u, iy'+v). Here, the coordinates (ix'+u, iy'+v) are analog quantities, and are thus made finer than the pixels of the frame information.

Furthermore, the rotational correction amount δ is read out from the RAM, and a coordinate conversion is performed so that the position of the pixel of interest i' is further caused to undergo a rotation of δ with the center of the frame image as the origin, thus canceling the rotational deviation of the object frame image (S320). Here, if the coordinates (ix'+u, iy'+v) are replaced by the coordinates (x', y') centered on the origin, and the distance from the origin to the coordinates (x', y') is designated as r', then the coordinates (x', y') are caused to move by −δ×y' in the direction of the x axis and δ·x' in the direction of the y axis by a rotation of δ. Specifically, the position of the pixel of interest i' with coordinates of (ix'+u, iy'+v) following translational movement is moved to the coordinates of (x'−δ·y', y'+δ·x'). Of course, the coordinates (x'−δ·y', y'+δ·x') are finer than the pixels of the frame information.

Subsequently, a judgment is made as to whether or not coordinate conversion has been performed for all of the pixels of the object frame information (S325). In cases where pixels remain for which coordinate conversion has not been performed, the processing of S305 through S325 is repeated while successively moving the pixel of interest i'; on the other hand, in cases where it is judged that coordinate conversion has been performed for all of the pixels, the processing proceeds to S330.

In S330, a judgment is made as to whether or not coordinate conversion has been performed for all of the sets of object frame information. In cases where object frame information remains for which coordinate conversion has not been performed, the processing of S305 through S330 is repeated. In the present embodiment, the object frame information is set in time series order, and the abovementioned coordinate conversion is performed. On the other hand, in cases where it is judged that coordinate conversion has been performed for all of the sets of object frame information, the present flow is ended.

As a result of the above processing, the object frame information can be converted by causing the object frame information to undergo a translational movement and rotational movement on the basis of the translational movement amount information and rotation amount information so that rotational deviation between the images expressed by the reference frame information and object frame information is eliminated.

Furthermore, it would also be possible to perform a coordinate conversion after multiplying u, v and δ by specified correction coefficients in accordance with the properties of the frame images or the like. Even if the correction coefficients are not 1, the frame information can be converted so that the translational movement deviation and rotational deviation among images expressed by a plurality of sets of frame information is reduced.

Furthermore, it would also be possible to perform a coordinate conversion on two sets of frame information using u, v and δ multiplied by specified correction coefficients.

(4-4) Synthesis of Frame Images—Part 1

When the frame conversion processing is completed, the processing proceeds to S120 in FIG. 10, and processing in which image data that expresses still images in halftones by means of numerous pixels is produced by the synthesis of the reference frame information and the three sets of object frame information for which conversion processing has been performed by the abovementioned frame conversion processing is performed by the synthesizing module.

Figure 13:
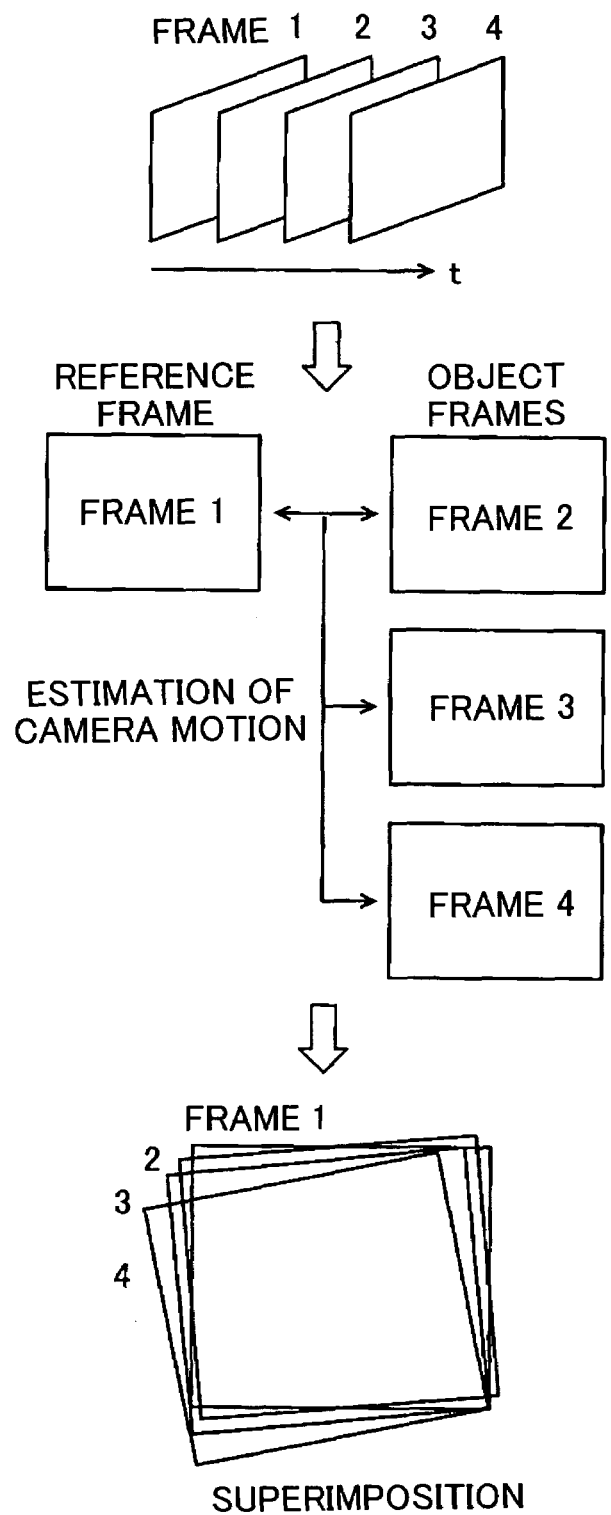
FIG. 13 is a diagram which shows the conditions of coordinate conversion and superimposition of the object frame information in model form.

As is shown in FIG. 13, processing is performed in which the three sets of object frame information that have been subjected to coordinate conversion are superimposed in accordance with the estimation of the camera motion from the four sets of frame information so that the translational movement deviation and rotational deviation with respect to the reference frame information is eliminated.

Figure 14:
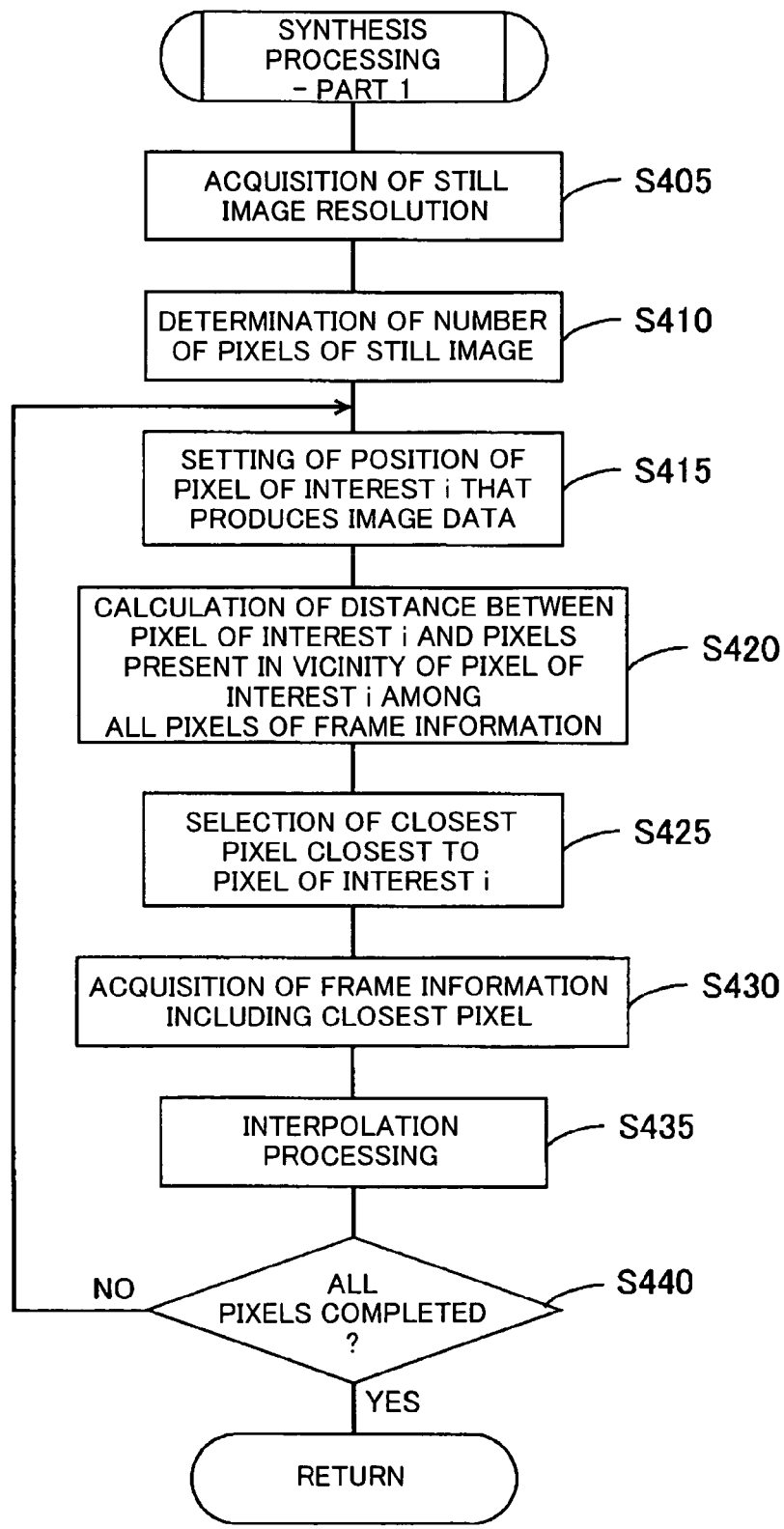
FIG. 14 is a flow chart which shows the synthesis processing (part 1)

FIG. 14 shows the synthesis processing by means of a flow chart.

First, the resolution of the still images to be expressed by the image data that is produced is acquired (S405). For example, a printing interface screen which has a resolution selection column can be displayed on the display, and a parameter that expresses the resolution of the still images following synthesis can be acquired from operating input into this resolution selection column, and can be stored in the RAM. Then, the ratio of the resolution of the still images to the resolution of the frame images constitutes the enlargement rate of the images, and the number of pixels of the image data following synthesis is determined so that this enlargement rate is obtained (S410). Thus, since the resolution of the still images can be varied and the number of pixels can be varied, still images desired by the user can be obtained. Since the image producing device of the present invention makes it possible to produce image data that expresses still images with a high image quality by synthesizing a plurality of sets of frame information, still images with a high image quality in which the number of pixels is increased can be obtained by setting the still images at a higher resolution than the frame images, so that more desirable still images can be obtained.

Below, the production of image data that expresses still images will be described using a case in which the pixels of the frame images are increased by 1.5 times in both the direction of the x axis and the direction of the y axis as an example. This image producing device produces image data by performing specified interpolation processing using the halftone data of pixels that are present in the area surrounding the pixel of interest that produces the image data (among all the pixels of the reference frame information and object frame information) while successively moving this pixel of interest.

Subsequently, the position of the pixel of interest i that produces the image data that expresses still images in halftones is set (S415). In the present embodiment, the position of the pixel of interest i corresponding to the still image is set in the same manner as in S220 in FIG. 11; however, the "i" referred to here is different from the pixel of interest i of the reference frame information in the abovementioned camera motion estimation processing.

When the pixel of interest i is set, the distances between this pixel of interest i and pixels that are present in the vicinity of the pixel of interest i (among all the pixels of all four sets of frame information) are calculated (S420). Next, the closest pixel which is closest to the pixel of interest i is selected (S425). In this selection, for example, the coordinate values of the closest pixel may be stored in a specified region in the RAM. Here, if the coordinates of the pixel of interest i using the produced image data as a reference are designated as (x0, y0) and the coordinates of pixels present in the vicinity of the pixel of interest i are designates as (xf, yf), then the pixel which is such that $[(xf-x0)^2+(yf-y0)^2]^{1/2}$ shows a minimum value may be taken as the closest pixel.

Furthermore, frame information including the closest pixel is acquired (S430). Here, the frame information that includes the closest pixel may be acquired by storing this frame information in a specified region in the RAM, or may be acquired by storing the memory address of the frame information that includes the closest pixel in a specified pointer in the RAM.

Figure 15:
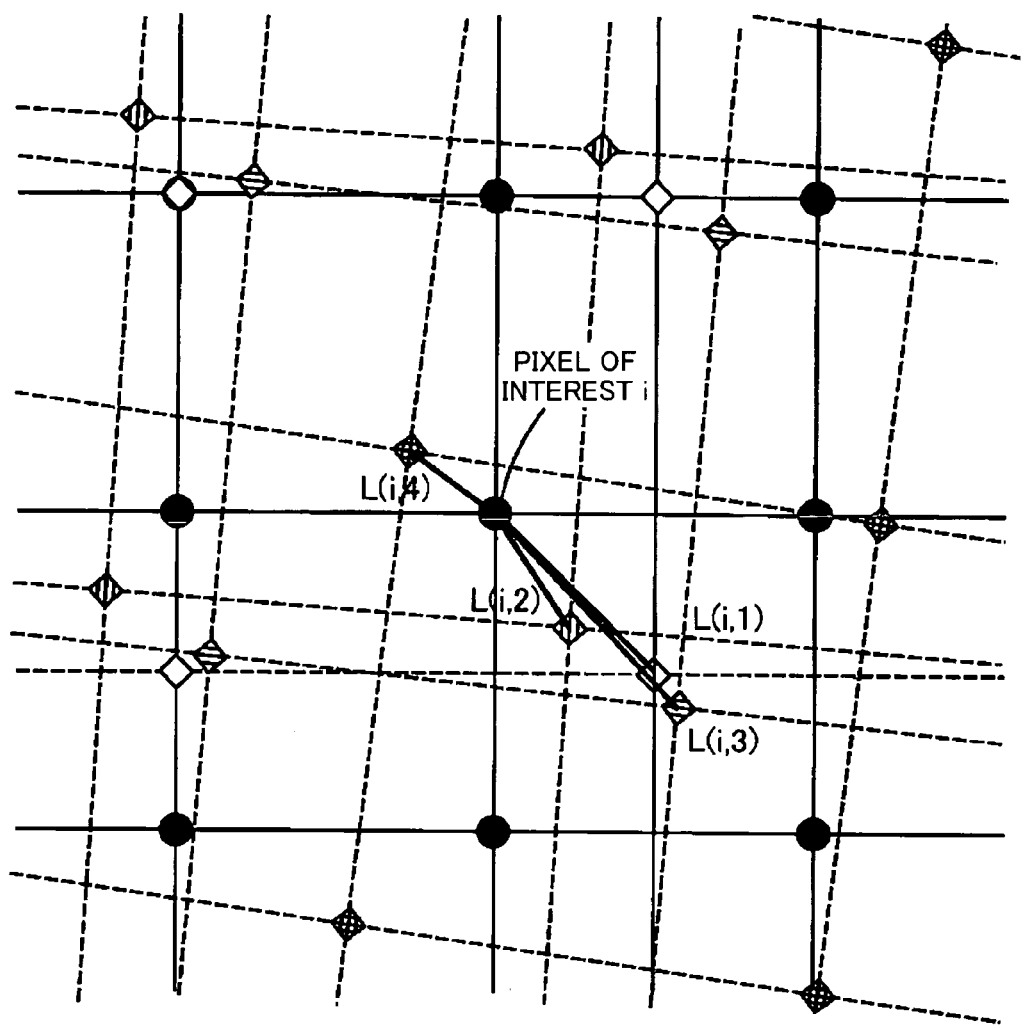
FIG. 15 is a diagram which shows the conditions of the selection of the closest pixel in model form.

FIG. 15 shows the conditions of selection of the abovementioned closest pixel in model form. In this figure, the positions of all of the pixels of the reference frame information and three sets of object frame information are plotted, and the positions of the pixels of the image data that is produced (1.5 times denser in the vertical and horizontal directions) are also plotted. Here, a frame number f (f=1, 2, 3, 4) is assigned to each set of frame information, and the pixel closest to the pixel of interest is selected from each set of frame information. In the figure, the distance between the selected pixel and the pixel of interest is designated as L(i, f). Then, fnearest(i) which is such that L(i, f) shows a minimum value is determined. As the pixels selected show a smaller fnearest(i) value (i. e., as the pixels selected are closer to the pixel of interest i), the jaggy in the edge portions of the still image tends to decrease as a result of interpolation processing referring to frame information containing these pixels. In the case of the pixel of interest i shown in the figure, since fnearest(i)=4, frame information of four frames is acquired.

When frame information including the closest pixel is acquired, specified interpolation processing by the by-linear method or the like is performed using the YCbCr data (halftone data) for the closest pixel from this frame information, so that image data for the pixel of interest i is produced (S435). In this case, the image data may be produced "as is" in the form of YCbCr data, or image data comprising RGB may be produced by using specified calculation formulae to convert the YCbCr data into RGB data comprising respective RGB halftone values.

Figure 16:
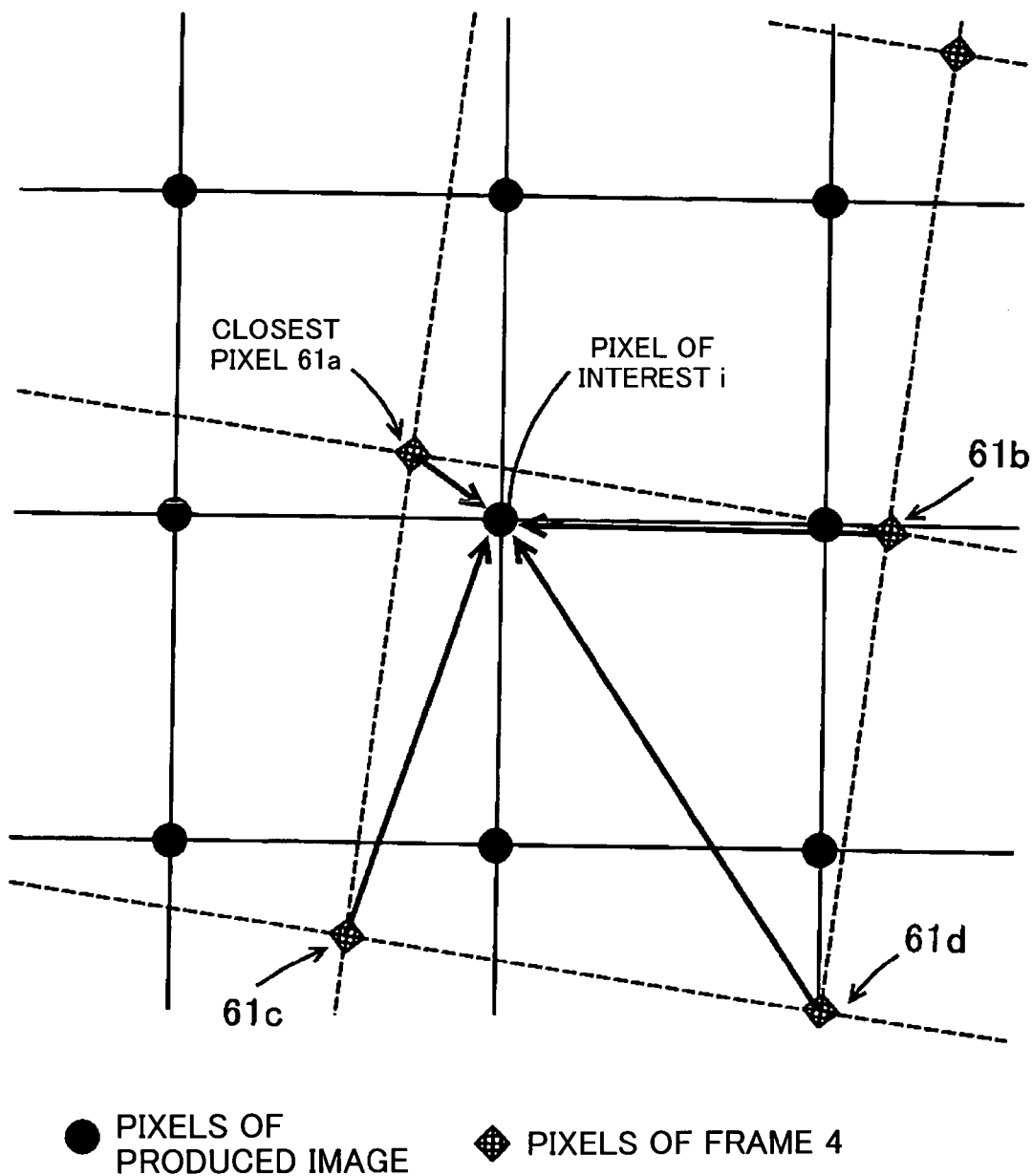
FIG. 16 is a diagram which shows the conditions of the interpolation processing performed by the by-linear method in model form.

FIG. 16 shows the conditions of interpolation processing using the by-linear method (co-primary interpolation method) in model form. As is shown in the figure, interpolation processing is performed using halftone data for four pixels 61a through 61d in the area surrounding the pixel of interest i (including the closest pixel 61a) from the acquired frame information. In the by-linear method, the weighting of the halftone data is gradually varied as the pixels (lattice points) 61a through 61d used in the interpolation calculations approach each other, and this variation is taken as a primary function that depends only on the halftone data of the pixels on both sides. Here, the regions demarcated by the four pixels 61a through 61d that surround the pixel of interest i for which interpolation is desired may be divided into four demarcations by the pixel of interest i, and the diagonal position data may be weighted by the area ratio.

If a similar procedure is performed for the respective pixels of the produced image data, all of the pixel values can be estimated.

Thus, superimposition can be performed on the basis of the positional relationship among the images estimated according to the camera motion, so that the halftone values (pixel values) of the pixels of the image data that is produced can be estimated from the halftone data for the pixels of the nearby frame information. Specifically, image data for the respective pixels is produced by interpolation, so that still images with a high image quality can be obtained.

Of course, interpolation processing by the nearest neighbor method may be performed in order to increase the speed of the processing that produces the image data. In this case, the halftone data for the closest pixel i n the frame information may be used as the image data for the pixel of interest i. Furthermore, interpolation processing with good precision may be performed, as in the by-cubic method.

Furthermore, the system may also be devised so that the "by-cubic method", "by-linear method" and "nearest neighbor method" can be selectively input, and so that the image data for the pixel of interest is produced by the image processing that is selected and input. Consequently, precedence can be give to either image quality or processing speed, so that the convenience of the system can be improved.

Subsequently, a judgment is made as to whether or not image data has been produced by interpolation processing for all of the pixels that produce the image data (S440). In a case where pixels remain that have not produced image data, the processing of S415 through S440 is repeated while successively moving the pixel of interest over the pixels corresponding to the image data that is produced. In a case where image data has been produced for all of the pixels, this flow is ended.

Thus, a plurality of sets of frame information that have been subjected to a coordinate conversion are synthesized, so that image data that expresses still images in halftones by means of numerous pixels is produced. Furthermore, in this stage, the YCbCr data may also be converted into RGB data or the like using specified calculation formulae.

When an actual experiment was performed, results in which the edge portions of the still images were free of jaggy were obtained by performing interpolation processing using halftone data for the pixel closest to the pixel of interest i (among all of the pixels of the plurality of sets of frame information). Thus, high-definition high-resolution images that cannot be obtained using only a single frame can be produced by using a plurality of frames. In particular, high-definition high-resolution images can be obtained in cases where the precision of the estimation of the movement of the individual frame images is good.

As a result of the abovementioned processing, the image data that expresses still images is produced by synthesis form a plurality of sets of frame information in which translational movement deviation and rotational deviation among the plurality of frame images expressed by the plurality of sets of frame information is eliminated. Manual blurring of video imaged by means of a digital video camera or the like contains not only deviation comprising parallel movement in the horizontal and vertical directions, but also diagonal components. However, since rotational deviation is also reduced, manual blurring including rotational components can be sufficiently corrected. Accordingly, still images with a high image quality can be obtained from a plurality of sets of frame information contained in video information. Of course, the translational movement components are also sufficiently corrected. Furthermore, since translational movement deviation of the specified central positions about which the object frame images are rotated is eliminated, the diagonal components of manual blurring can be more reliably corrected, so that still images with a higher image quality can be obtained.

Here, since the plurality of sets of frame information that are synthesize constitute information that is continuous in a time series with little variation, still images with a high image quality can be obtained by means of a simple construction as a result of image data that expresses still images being produced by the synthesis of the abovementioned sets of frame information.

(4-5) Synthesis of Frame Images—Part 2

Figure 17:
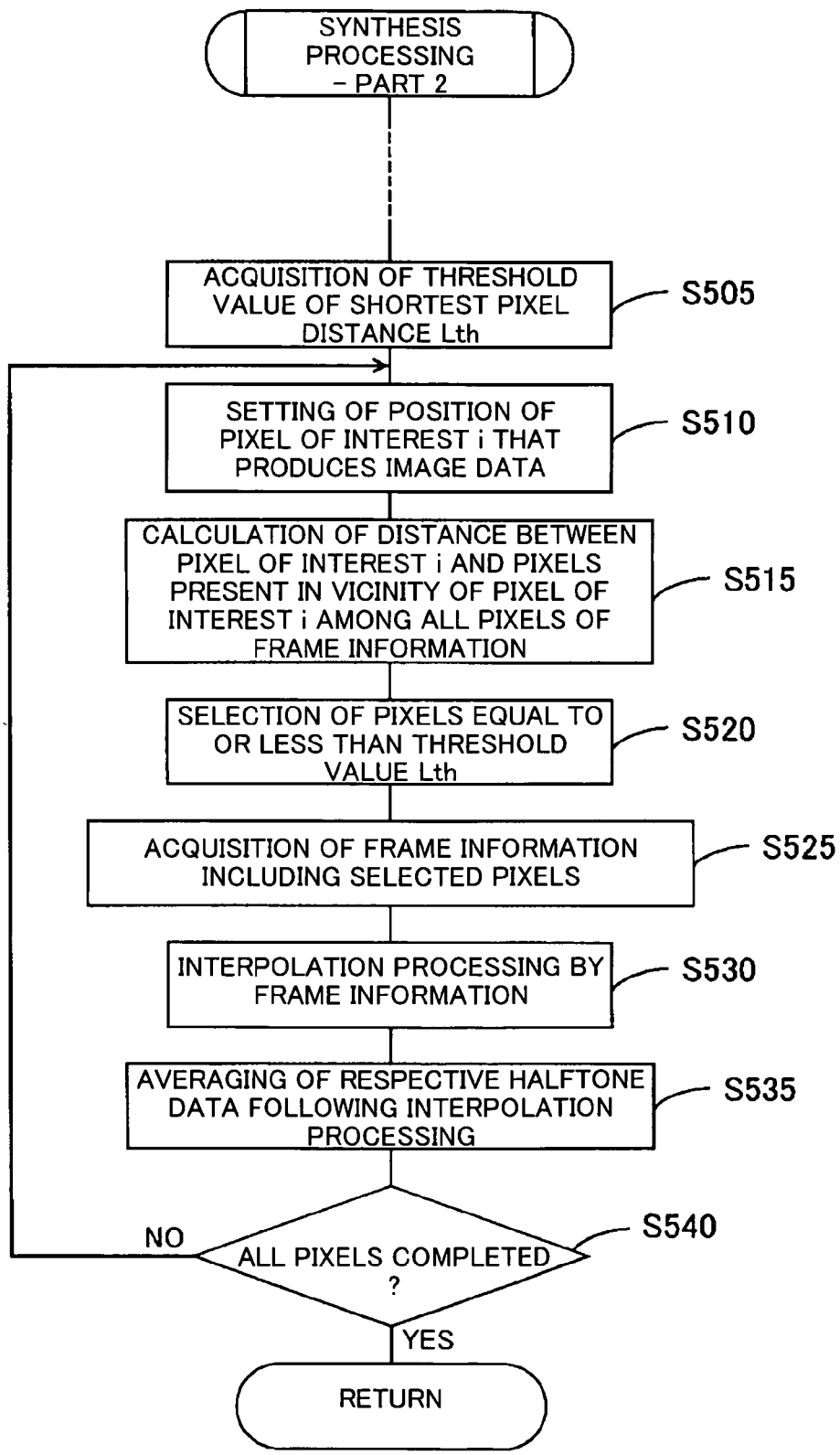
FIG. 17 is a flow chart which shows the synthesis processing (part 2)

Furthermore, synthesis processing may also be performed in accordance with the flow chart shown in FIG. 17.

Although this is not shown in the figures, the resolution of the still images is acquired and the number of pixels of the image data following synthesis is determined in the same manner as in S405 through S410 in FIG. 14, and the threshold value Lth of the shortest pixel distance is then acquired (S505). For example, a printing interface screen which has a specified selection column may be displayed, and a parameter that expresses the threshold value Lth may be acquired from an operating input into this selection column, and stored in the RAM.

Figure 18:
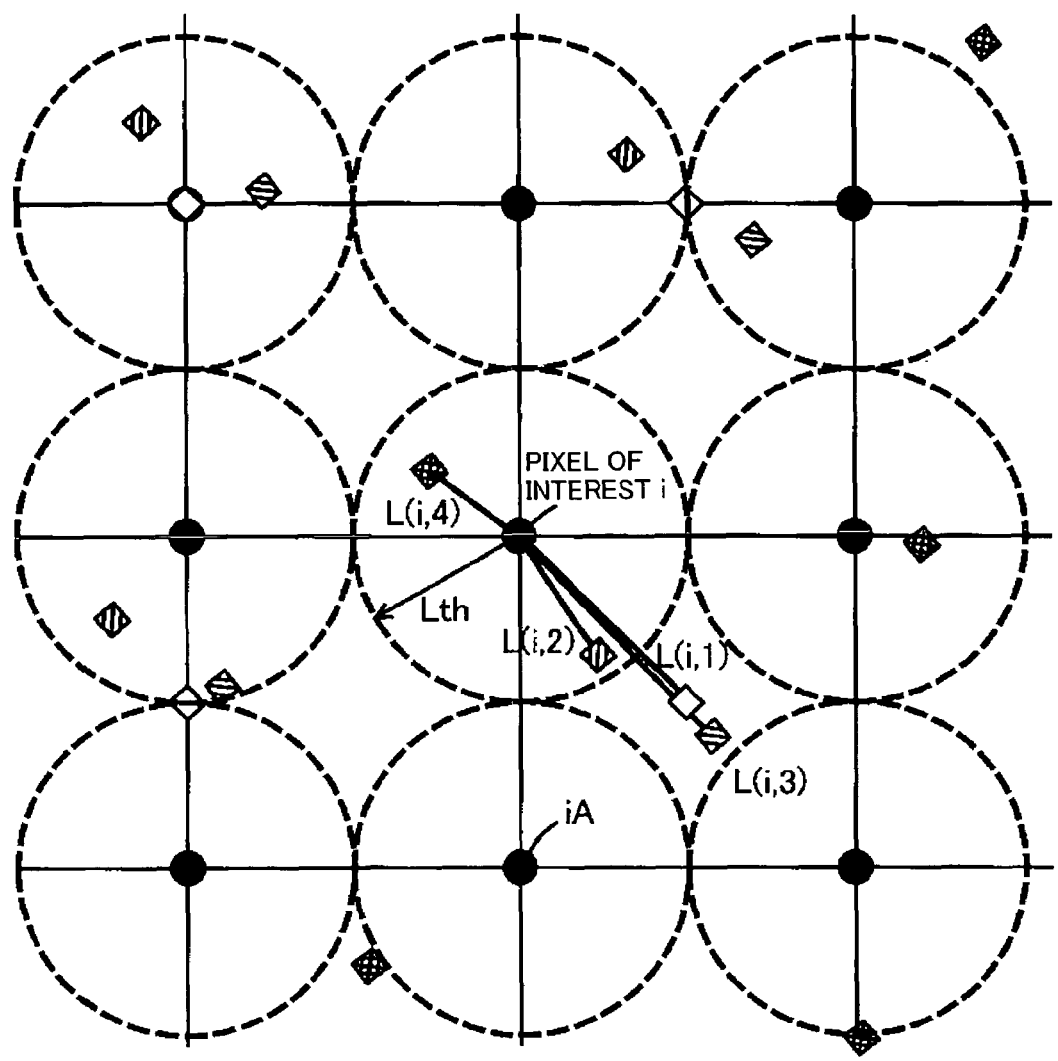
FIG. 18 is a diagram which shows the conditions of the selection of pixels within a specified range from the pixel of interest i in model form.

Here, as is shown in FIG. 18, the threshold value Lth of the shortest pixel distance is the threshold value that is used to judge whether or not a pixel in the frame information is within a specified distance from the pixel of interest i. In the example shown in the figure, ½ of the distance among the pixels in the image data that is produced is used as the threshold value Lth. The circles drawn by dotted lines that are centered on the respective pixels including the pixel of interest indicate regions within the distance of the threshold value Lth from the same pixels.

Furthermore, besides acquiring a parameter that expresses the threshold value Lth by an operating input, it would also be possible to set the threshold value Lth automatically from values such as the number of pixels of the images produced, the total number of pixels of the frame images or the like.

For example, if it is assumed that $$Lth = 3 \times (\text{distance among pixels in the images produced}) \times (\text{number of pixels of the images produced}) / (\text{total number of pixels of the frame images})$$

then the threshold value Lth can be set as a value which is such that an average of 3 frame image pixels fall within the circles shown in FIG. 18.

Next, the position of the pixel of interest i that produces the image data expressing still images in halftones is set in the same manner as in the abovementioned S415 through S420 (S510), and the pixels of coordinates (xf, yf) that are present in the vicinity of the pixel of interest i and the distance $[(xf-x0)^2+(yf-y0)^2]^{1/2}$ from the pixel of interest i of coordinates (x0, y0) are calculated (S515).

Furthermore, the pixels of the frame information whose calculated distance is equal to or less than the threshold value Lth are selected (S520). In this selection, for example, the coordinate values of the pixels may be stored in a specified region of the RAM. In the example shown in FIG. 18, a pixel with a distance of L(i, 4) and a pixel with a distance of L(i, 2) are selected.

Thus, pixels which are within a specified range using the pixel of interest i as a reference can be selected from the plurality of sets of frame information.

Subsequently, frame information including the selected pixels is acquired (S525). Next, for each set of frame information, specified interpolation processing such as interpolation processing by the by-linear method or the like is performed using YCbCr data for the closest pixel from the same frame information, so that halftone data for each set of frame information is produced (S530). Specifically, interpolation processing is performed using frame information that includes pixels within a specified range using the pixel of interest i as a reference (among the plurality of sets of frame information).

Then, the arithmetical mean of the respective halftone data following interpolation processing is determined, so that halftone data for the pixel of interest i is produced (S535). Here, the halftone data following interpolation processing may be YCbCr data or RGB data. Besides arithmetical averaging, it would also be possible to use geometrical averaging, harmonic averaging, averaging with different weighting according to the frame information or the like in the summarization of the halftone data. In cases where there is only one pixel of frame information within the specified range from the pixel of interest i, the speed of the processing that produces the image data can be increased by omitting the processing that performs averaging.

Furthermore, in cases where there is no pixel of frame information with a distance equal to or less than the threshold value Lth (i. e., the specified range) from the pixel of image data produced, as in the case of the pixel iA in FIG. 18, interpolation processing may be performed using any frame information among the plurality of sets of frame information. In this case, interpolation processing may be performed using the reference frame information, or interpolation processing may be performed by acquiring frame information that includes the closest pixel as shown in FIG. 14. In this way, all of the pixels of the image data that is produced can be securely embedded.

Subsequently, a judgment is made as to whether or not image data has been produced by interpolation processing for all of the pixels of the image data that is produced (S540). In cases where pixels remain for which image data has not been produced, the processing of S505 through S540 is repeated while successively moving the pixel of interest i. If image data has been produced for all of the pixels, this flow is ended.

As a result of the above processing, a plurality of sets of frame information that have been subjected to a coordinate conversion are synthesized, so that image data that expresses still images in halftones by means of numerous pixels is produced.

In particular, if the abovementioned processing is performed, the deviation among the frame images can be made inconspicuous in cases where the precision of the estimation of the movement of the individual frame images is not good. Accordingly, in such cases, high-definition high-resolution images can be obtained.

(4-6) Synthesis of Frame Images—Part 3

Figure 19:
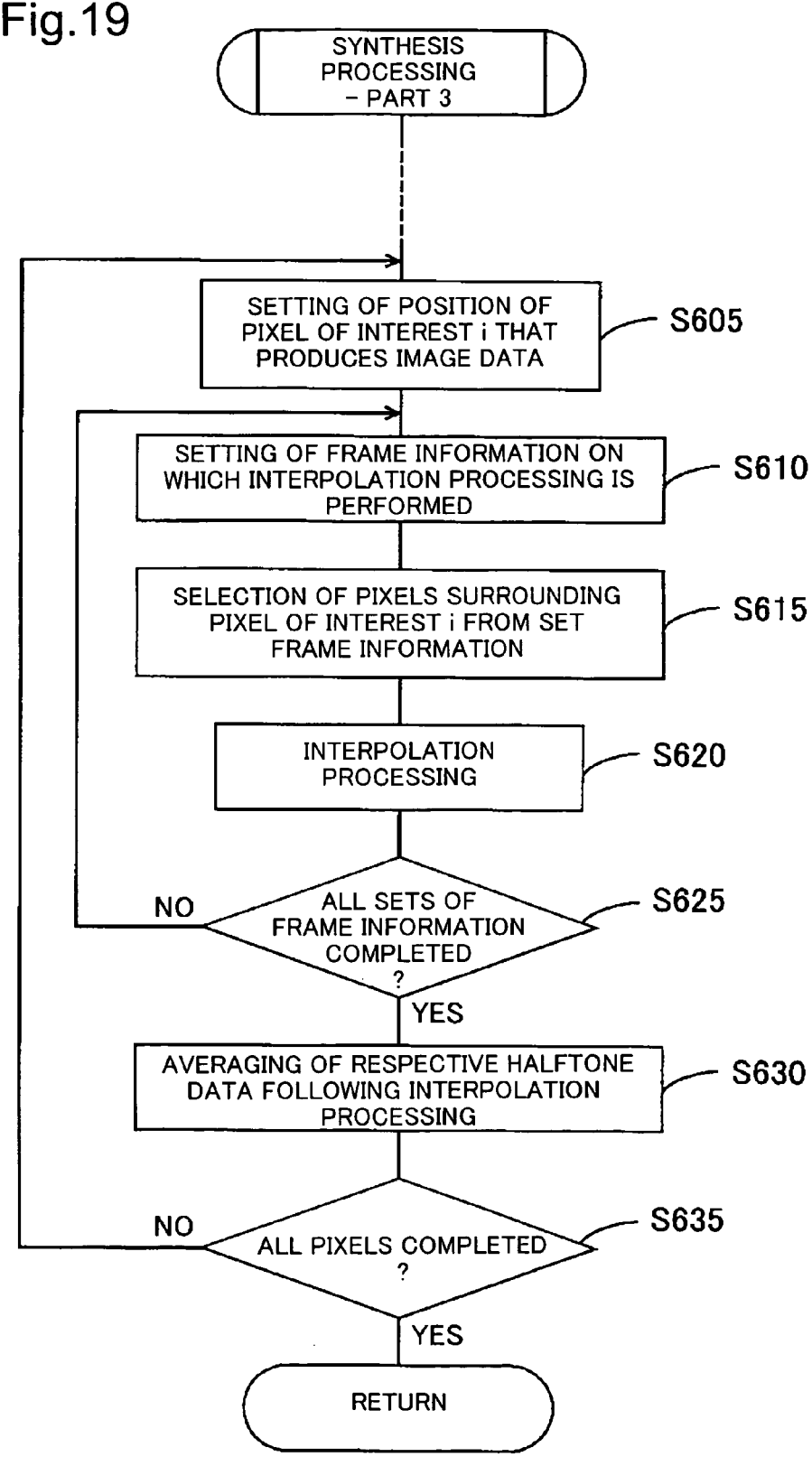
FIG. 19 is a flow chart which shows the synthesis processing (part 3)

Furthermore, the synthesis processing may also be performed in accordance with the flow chart shown in FIG. 19.

Although this is not shown in the figures, the resolution of the still images is acquired and the number of pixels of the image data following synthesis is determined in the same manner as in S405 through S410 in FIG. 14, and the position of the pixel of interest i that produces image data that expresses still images in halftones is then set (S605). Next, the frame information (among the four sets of frame information) for which interpolation processing is performed is set (S610).

The set frame information may be stored in a specified region of the RAM, or the memory address may be stored in a specified pointer. Furthermore, pixels surrounding the pixel of interest i are selected from the set frame information (S615). Then, image data for the pixel of interest i is produced by performing specified interpolation processing by the by-cubic method or the like using halftone data such as YCbCr data or the like for the selected pixels (S620).

The by-cubic method utilizes data for a total of 16 pixels, including not only the pixels (lattice points) surrounding the pixel of interest i for which interpolation is desired, but also the surrounding pixels located to the outside of these surrounding pixels. The halftone value for the pixel of interest i is determined while being affected by the halftone values of the abovementioned total of 16 pixels surrounding this pixel of interest i. For example, if interpolation is performed by first-order equations, then weighting may be added in inverse proportion to the distance from two pixels on either side of the pixel of interest i. Furthermore, the effect according to distance may be expressed by a third-order folding function (t)={sin(πt)}/πt.

Subsequently, a judgment is made as to whether or no interpolation processing has been performed for all of the frame information (S625). In cases where frame information remains for which interpolation processing has not been performed, the processing of S610 through S625 is repeated; if interpolation processing has been performed for all of the frame information, the processing proceeds to S630.

In S630, the arithmetical mean of the respective halftone data following interpolation processing is determined, and image data for the pixel of interest i is produced. Besides arithmetical averaging, it would also be possible to use geometrical averaging, harmonic averaging, averaging with different weighting according to the frame information or the like in the summarization of the halftone data.

Then, a judgment is made as to whether or not image data has been produced by interpolation processing for all of the pixels of the image data that is produced (S635). In cases where pixels remain for which image data has not been produced, the processing of S605 through S635 is repeated while successively moving the pixel of interest i. If image data has been produced for all of the pixels, this flow is ended.

In the above processing as well, a plurality of sets of frame information for which a coordinate conversion has been performed are synthesized, so that image data that expresses still images in halftones by means of numerous pixels is produced. Here, since pixels are present in lattice form in each set of frame information, still images with a high image quality can be obtained by utilizing interpolation processing that has good precision such as the by-cubic method or the like. Furthermore, since the deviation among frame images can be made inconspicuous in cases where the precision of the estimation of the movement of the individual frame images is not good, high-definition high-resolution images can be obtained in such cases.

(5) Modifications

The image producing device and image deviation amount detection device of the present invention may have various constructions.

For example, the printer may be integrated with a computer. Besides being realized within the main body of a computer, the abovementioned flow may also be realized (either in part or as a whole) in a printer or special image output device.

Besides being arranged in the form of a dot matrix in which the pixels are lined up in order in the vertical and horizontal directions, the numerous pixels that constitute the image data may have various other constructions. For example, the image data may also be constructed from pixels that are lined up in order in the form of beehive, in which the pixels are densely arranged in a regular hexagonal shape.

There is no limit on the number of the plurality of sets of frame information that are synthesized, as long as this number is two or more. Furthermore, the present invention can also be used in cases where image data that expresses still images is produced by synthesizing portions of frame images. Moreover, even in the case of interlaced video which has regions that cannot be comprehended on a line by line basis, an effect in I-P conversion can be manifested by superimposition on a field by field basis, so that one scene of a moving image can be expressed as a high-resolution still image, and so that the definition can be increased in the case of printing. Of course, the present invention is also effective in the superimposition of a plurality of frames in which the object is not necessarily conversion of the resolution (e. g., panorama synthesis and the like).

Furthermore, in the present invention, since translational movement deviation and rotational deviation can be eliminated, translational movement deviation and rotational deviation arising from causes other than manual blurring can also be corrected.

Furthermore, in the detection of the translational movement correction amount and rotational correction amount of the frame images, this detection may also be performed while varying the reference frame information.

FIG. 20 shows in model form the processing that is performed by an image producing device constituting a modification. In this modification as well, four sets of frame information are acquired from the video information. Then, in the camera motion estimation processing, translational movement amount information and rotation amount information are acquired from sets of frame information that are adjacent to each other in time series order. Specifically, first translational movement amount information (translational movement correction amounts u1 and v1) and first rotation amount information (rotational correction amount δ1) that express the deviation between the two images expressed by a first set of frame information comprising frame 1 that is used as reference frame information and second set of frame information comprising frame 2 that is used as object frame information are acquired. Next, second translational movement amount information (translational movement correction amounts u2 and v2) and second rotation amount information (rotational correction amount δ2) that express the deviation between the two images expressed by the second set of frame information comprising frame 2 that is used as reference frame information and third set of frame information comprising frame 3 that is used as object frame information are acquired. Furthermore, second translational movement amount information in a separate sense (translational movement correction amounts u3 and v3) and second rotation amount information in a separate sense (rotational correction amount δ3) that express the deviation between the two images expressed by the second set of frame information in a separate sense comprising frame 3 that is used as reference frame information and third set of frame information in a separate sense comprising frame 4 that is used as object frame information are acquired.

Furthermore, the camera motion estimation processing can also be performed according to the flow shown in FIG. 11.

Specifically, reference frame information is set from a plurality of sets of frame information acquired from the video information (in the order of frames 1, 2 and 3), and object frame information is likewise set (in the order of frames 2, 3 and 4). Furthermore, the respective variables are initially set (S205 through S215). Next, for all of the pixels of the reference frame information, the positions of the pixels of interest i and i' are set from both sets of frame information, and $Pt_i$, $k_i$, M20, M11, M02, $m_u$, $m_v$, $m_\delta$, $c_u$, $c_v$ and $c_\delta$ are successively calculated (S220 through S230). Furthermore, d is calculated, and the translational movement correction amounts u1 through u3 and v1 through v3 and rotational correction amounts δ1 through δ3 are successively calculated and stored in memory as translational movement amount information and rotation amount information (S235 through S250). Specifically, translational movement amount information (u1, v1) and rotation amount information (δ1) expressing the deviation between the two images expressed by the first and second sets of frame information can be acquired on the basis of these first and second sets of frame information, and translational movement amount information (u2, u3, v2, v3) and rotation amount information (δ2, δ3) expressing the deviation between the two images expressed by the second and third sets of frame information can be acquired on the basis of these second and third sets of frame information. When translational movement amount information and rotation amount information has been acquired for all of the frame information, this flow is ended (S255).

When translational movement amount information and rotation amount information are acquired, frame conversion processing is performed for the frame information of frames 2 through 4 in accordance with the frame image of the fist frame 1 in time series order.

In outline, the frame conversion processing can be performed according to the flow shown in FIG. 12.

Specifically, object frame information in which the coordinates of the pixels are to be converted is set in the order of frames 2 through 4, and the position of the pixel of interest i' for which a coordinate conversion is to be performed is set (S305 through S310). Next, for all of the pixels of the object frame information, the position of the pixel of interest i' is converted so that the translational movement deviation and rotational deviation with respect to the frame image of frame 1 are eliminated (S315 through S325). Here, for the object frame information of frames 2, 3 and 4, a coordinate conversion is performed so that the positions of the respective pixels of interest i' are caused to undergo a translational movement of −u1, −u1−u2 and −u1−u2−u3 in the direction of the x axis and −v1, −v1−v2 and −v1−v2−v3 in the direction of the y axis, and a rotational movement of −δ1, −δ1−δ2 and −δ1−δ2−δ3. Specifically, conversion processing can be performed in which the second set of frame information is converted on the basis of the first rotation amount information so that the deviation relative to the image expressed by the first set of frame information is eliminated, and in which the third set of frame information is converted on the basis of the first and second rotation amount information so that the rotational deviation with respect to the image expressed by the first set of frame information is eliminated. When conversion processing has been performed for the frame information of frames 2 through 4, this flow is ended (S330).

Subsequently, if synthesis processing is performed, image data that expresses still images in halftones can be produced.

Specifically, since the deviation between the images that are expressed by the second and third sets of frame information that are adjacent in time series order is generally smaller than the rotational deviation between the images expressed by the first and third sets of frame information, translational movement correction amounts for correcting the translational movement deviation and rotational correction amounts for correcting the rotational deviation can be detected with a higher degree of precision. Accordingly, translational movement amount information and rotation amount information can be acquired with a high degree of precision, so that still images with a higher image quality can be obtained.

As was described above, the present invention can provide, in various aspects, an image producing device, image deviation amount detection device, image production program and image deviation amount detection program which make it possible to obtain still images with a high image quality from a plurality of sets of frame information contained in video information. Furthermore, the present invention can also be applied as an image production method and image deviation amount detection method.

In the abovementioned embodiments, a case was described in which high-resolution still images were produced by synthesizing a plurality of sets of frame information continuous in a time series that were acquired from video information. However, the present invention is not limited to this. It would also be possible to produce high-resolution images merely by synthesizing a plurality of sets of image information that are continuous in a time series. For example, such a plurality of sets of image information that are continuous in a time series may be a plurality of sets of image information successively acquired by a digital camera.

Furthermore, it is not always necessary that the information used be a plurality of sets of image information (including frame information) that are continuous in a time series; this information may also be a plurality of sets of image information that are lined up in a time series.

In the abovementioned embodiments, a personal computer (PC) is used as the image producing device; however, the present invention is not limited to this. The abovementioned image producing device may be contained in a video camera, digital camera, printer, DVD player, video tape player, hard disk player, camera-equipped portable telephone or the like. In particular, in cases where a video camera is used as the image producing device of the present invention, still images with a high resolution can be produced from a plurality of sets of frame information contained in acquired video information while this video information is being acquired. Similarly, in cases where a digital camera is used as the image producing device of the present invention, still images with a high resolution can be produced from a plurality of sets of imaging information while imaging the object of imaging or checking the results of imaging.

What is claimed is:

1. An image producing device comprising:
   a frame acquisition module acquiring a plurality of sets of frame information from video information, wherein the video information comprises numerous sets of frame information, and the frame information expresses images as halftone data for numerous individual pixels;
   a deviation amount acquisition module acquiring rotation amount information on the basis of the plurality of sets of frame information, wherein the rotation information expresses the rotational deviation among images expressed by the plurality of sets of frame information;
   a conversion module converting at least one of the plurality of sets of frame information so that the rotational deviation among images is reduced by rotating at least one of the respective images expressed by the plurality of sets of frame information on the basis of the acquired rotation amount information; and
   a synthesizing module producing image data by synthesizing a plurality of sets of frame information on which the conversion processing has been performed, wherein the image data expresses images in halftones by means of numerous pixels.

2. The image producing device according to claim 1, wherein the deviation amount acquisition module acquires translational movement amount information that expresses translational deviation among images expressed by the plurality of sets of frame information on the basis of the plurality of sets of frame information, and the conversion module performs conversion processing on the basis of the acquired translational movement amount information in which at least one of the plurality of sets of frame information is converted by causing at least one of the respective images expressed by the plurality of sets of frame information to perform a translational movement so that the translational deviation among images is reduced.

3. The image producing device according to claim 2, wherein the conversion module performs conversion processing on the basis of the rotation amount information and translational movement amount information in which the positions of the respective pixels in at least one of the plurality of sets of frame information are converted in units finer than the pixels so that the deviation of the images is reduced.

4. The image producing device according to claim 3, wherein the deviation amount acquisition module acquires the rotation amount information and translational movement amount information by determining the rotational deviation and translational movement deviation among the images using calculation formulae that determine the rotational deviation and translational movement deviation by the method of least squares on the basis of the positions of the pixels and the halftone data for the pixels in the plurality of sets of frame information.

5. The image producing device according to claim 1, wherein the synthesizing module produces the image data with a different number of pixels from that of the frame information.

6. The image producing device according to claim 5, wherein the synthesizing module produces the image data with a greater number of pixels than that of the frame information.

7. The image producing device according to claim 1, wherein the frame acquisition module acquires first, second and third sets of frame information in time series order form the video information,
   the deviation amount acquisition module acquires first rotation amount information that expresses the rotational deviation between the two images expressed by the first and second sets of frame information on the basis of the first and second sets of frame information, and acquires second rotation amount information that expresses the rotational deviation between the two images expressed by the second and third sets of frame information on the basis of the second and third sets of frame information, and
   the conversion module performs conversion processing which converts the second set of frame information by rotating the image expressed by the second set of frame information on the basis of the first rotation amount information so that the rotational deviation between the image expressed by the second set of frame information and the image expressed by the first set of frame information is reduced, and which converts the third set of frame information by rotating the image expressed by the third set of frame information on the basis of the first rotation amount information and second rotation amount information so that the rotational deviation between the image expressed by the third set of frame information and the image expressed by the first set of frame information is reduced.

8. The image producing device according to claim 1, wherein the synthesizing module produces the image data by performing specified interpolation processing from a plurality of sets of frame information on which the conversion processing has been performed.

9. The image producing device according to claim 8, wherein the synthesizing module performs the interpolation processing using halftone data for pixels that are present in the area surrounding a pixel of interest that produces the image data, among all of the pixels of the plurality of sets of frame information, while successively moving the pixel of interest, and produces the image data from the halftone data following this interpolation processing.

10. An image processing device comprising:
a frame acquisition module acquiring a plurality of sets of frame information from video information, wherein the video information comprises numerous sets of frame information, and the frame information expresses images as halftone data for numerous individual pixels; and
a synthesizing module which, in order to produce image data that expresses images in halftones using numerous pixels by synthesizing the plurality of sets of frame information, perform specified interpolation processing using halftone data for pixels that are present in the area surrounding a pixel of interest that produces the image data, among all of the pixels of the plurality of sets of frame information, while successively moving the pixel of interest, and produces the image data from the halftone data following this interpolation processing.

11. The image producing device according to claim 9, wherein the synthesizing module performs the interpolation processing using halftone data for the pixel that is closest to the pixel of interest among all of the pixels of the plurality of sets of frame information.

12. The image producing device according to claim 10, wherein the synthesizing module performs the interpolation processing using halftone data for the pixel that is closest to the pixel of interest among all of the pixels of the plurality of sets of frame information.

13. The image producing device according to claim 11, wherein the synthesizing module performs the interpolation processing using frame information that includes the pixel closest to the pixel of interest among the plurality of sets of frame information.

14. The image producing device according to claim 12, wherein the synthesizing module performs the interpolation processing using frame information that includes pixels closest to the pixel of interest among the plurality of sets of frame information.

15. The image producing device according to claim 9, wherein the synthesizing module performs the interpolation processing using frame information that includes pixels within a specified range based on the pixel of interest among the plurality of sets of frame information.

16. The image producing device according to claim 10, wherein the synthesizing module performs the interpolation processing using frame information that includes pixels within a specified range based on the pixel of interest as a reference among the plurality of sets of frame information.

17. The image producing device according to claim 9, wherein the synthesizing module performs the interpolation processing for each of the plurality of sets of frame information, and produces the image data from the respective halftone data following the interpolation processing.

18. The image producing device according to claim 10, wherein the synthesizing module performs the interpolation processing for each of the plurality of sets of frame information, and produces the image data from the respective halftone data following the interpolation processing.

19. An image deviation amount detection device comprising:
a frame acquisition module acquiring a plurality of sets of frame information from video information, wherein the video information comprises numerous sets of frame information, and the frame information expresses images as halftone data for numerous individual pixels; and
a deviation amount detection module detecting an amount of rotation that expresses the rotational deviation among the images expressed by the plurality of sets of frame information on the basis of the plurality of sets of frame information.

20. An image production method comprising the steps of:
(a) acquiring a plurality of sets of frame information from video information comprising numerous sets of frame information expressing images as halftone data for numerous individual pixels;
(b) acquiring rotation amount information that expresses the rotational deviation among the images expressed by the plurality of sets of frame information on the basis of the plurality of sets of frame information;
(c) performing conversion processing, on the basis of the acquired rotation amount information, that converts at least one of the plurality of sets of frame information by rotating at least one of the respective images expressed by the plurality of sets of frame information so that the rotational deviation among the images is reduced; and
(d) producing image data that expresses images in halftones using numerous pixels by synthesizing a plurality of sets of frame information on which the conversion processing has been performed.

21. An image production method comprising the steps of:
(a) acquiring a plurality of sets of frame information from video information comprising numerous sets of frame information expressing images as halftone data for numerous individual pixels; and
(b) in order to produce image data that expresses images in halftones using numerous pixels by synthesizing the plurality of sets of frame information, performing specified interpolation processing using halftone data for pixels that are present in the area surrounding a pixel of interest that produces the image information, among all the pixels of the plurality of sets of frame information, while successively moving this pixel of interest, and produces the image data from the halftone data following the interpolation processing.

22. An image production method comprising the steps of:
(a) acquiring a plurality of sets of frame information from video information comprising numerous sets of frame information expressing images as halftone data for numerous individual pixels; and
(b) detecting an amount of rotation that expresses the rotational deviation among the images expressed by the plurality of sets of frame information on the basis of the plurality of sets of frame information.

23. A recording medium on which a computer program that is used in order to realize the following functions in a computer is recorded:
a frame acquisition function which acquires a plurality of sets of frame information from video information comprising numerous sets of frame information expressing images as halftone data for numerous individual pixels;
a deviation amount acquisition function which acquires rotation amount information that expresses the rotational deviation among the images expressed by the plurality of sets of frame information on the basis of the plurality of sets of frame information;
a conversion function which performs conversion processing, on the basis of the acquired rotation amount information, that converts at least one of the plurality of sets of frame information by rotating at least one of the respective images expressed by the plurality of sets of frame information so that the rotational deviation among the images is reduced; and a synthesizing function which produces image data that expresses images in halftones using numerous pixels by synthesizing a plurality of sets of frame information on which the conversion processing has been performed.

24. A recording medium on which a computer program that is used in order to realize the following functions in a computer is recorded:

a frame acquisition function which acquires a plurality of sets of frame information from video information comprising numerous sets of frame information expressing images as halftone data for numerous individual pixels; and a synthesizing function which, in order to produce image data that expresses images in halftones using numerous pixels by synthesizing the plurality of sets of frame information, performs specified interpolation processing using halftone data for pixels that are present in the area surrounding a pixel of interest that produces the image information, among all the pixels of the plurality of sets of frame information, while successively moving this pixel of interest, and produces the image data from the halftone data following this interpolation processing.

25. A recording medium on which a computer program that is used in order to realize the following functions in a computer is recorded:

a frame acquisition function which acquires a plurality of sets of frame information from video information comprising numerous sets of frame information expressing images as halftone data for numerous individual pixels; and a deviation amount detection function which detects an amount of rotation that expresses the rotational deviation among the images expressed by the plurality of sets of frame information on the basis of the plurality of sets of frame information.

* * * * *